United States Patent
Swarbrick et al.

(10) Patent No.: US 10,025,747 B2
(45) Date of Patent: Jul. 17, 2018

(54) I/O CHANNEL SCRAMBLING/ECC DISASSOCIATED COMMUNICATION PROTOCOL

(71) Applicants: Ian Swarbrick, Santa Clara, CA (US); Michael Bekerman, San Jose, CA (US); Craig Hanson, San Jose, CA (US); Chihjen Chang, Fremont, CA (US)

(72) Inventors: Ian Swarbrick, Santa Clara, CA (US); Michael Bekerman, San Jose, CA (US); Craig Hanson, San Jose, CA (US); Chihjen Chang, Fremont, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 251 days.

(21) Appl. No.: 14/967,258

(22) Filed: Dec. 11, 2015

(65) Prior Publication Data
US 2016/0328156 A1    Nov. 10, 2016

Related U.S. Application Data

(60) Provisional application No. 62/158,420, filed on May 7, 2015.

(51) Int. Cl.
*G06F 13/38*    (2006.01)
*G06F 13/42*    (2006.01)

(52) U.S. Cl.
CPC ............................ *G06F 13/4234* (2013.01)

(58) Field of Classification Search
CPC ................................................... G06F 13/4234
USPC ............................................................ 710/74
See application file for complete search history.

(56) References Cited

U.S. PATENT DOCUMENTS

| | | | |
|---|---|---|---|
| 6,212,585 B1 * | 4/2001 | Chrabaszcz | H04L 29/06 709/220 |
| 7,644,216 B2 * | 1/2010 | Fahr | G06F 13/16 365/63 |
| 8,261,159 B1 | 9/2012 | Sommer et al. | |
| 8,312,304 B2 * | 11/2012 | Kwa | G06F 1/3215 710/302 |

(Continued)

*Primary Examiner* — Paul R Myers
(74) *Attorney, Agent, or Firm* — Renaissance IP Law Group LLP

(57) ABSTRACT

A protocol that enables communication between a host and an Input/Output (I/O) channel storage device, such as a Dynamic Random Access Memory (DRAM) channel Dual In-Line Memory Module (DIMM) form-factor Solid State Drive (SSD), without the need to know or reverse engineer the encoding applied by the host. The control/status data are written to the storage device by sending a protocol training sequence of known values and storing the associated command/status data in the storage device in the same encoding format as that received from the host. These stored values are used at run time to execute encoded commands received from the host and to report status data to the host in the host-recognizable manner. A memory bank-based buffered configuration stores user data also in the as-received condition to preserve the host-specific encoding. This facilitates exchange of user data between the host memory controller and the storage device over the DRAM channel.

21 Claims, 7 Drawing Sheets

(56) References Cited

U.S. PATENT DOCUMENTS

| | | | | |
|---|---|---|---|---|
| 8,639,918 B2* | 1/2014 | Berke | ....................... | G11O 5/14 |
| | | | | 710/11 |
| 9,026,725 B2* | 5/2015 | Kostinsky | ............ | G11C 7/1063 |
| | | | | 365/189.17 |
| 9,665,513 B2* | 5/2017 | Levy | ..................... | G06F 13/287 |
| 2010/0289949 A1* | 11/2010 | Kobayashi | .......... | G06F 13/4081 |
| | | | | 348/469 |
| 2013/0054884 A1* | 2/2013 | Gupta | ..................... | G06F 13/20 |
| | | | | 711/105 |
| 2014/0173369 A1 | 6/2014 | Chen et al. | | |
| 2014/0237176 A1 | 8/2014 | Takefman et al. | | |
| 2014/0293718 A1* | 10/2014 | Prakash | ................ | G06F 3/0418 |
| | | | | 365/193 |
| 2014/0310534 A1 | 10/2014 | Gurgi et al. | | |
| 2015/0095565 A1* | 4/2015 | Morris | ............... | G06F 13/1689 |
| | | | | 711/109 |

* cited by examiner

FIG. 8

Address Mapping and Set Associativity
(Assuming 2 banks, 2 buffers each, 16 K IO Buffers size

34 ⟶

Addr Offset
0x0

| Bank/Buffer | LBAs | # |
|---|---|---|
| Bank 0, buffer 0 (119) | LBAs 0, 16, 32, 48.... | 125 |
| | LBAs 1, 17, 33, 49.... | 126 |
| | LBAs 2, 18, 34, 50.... | 127 |
| 0x4000 | LBAs 3, 19, 35, 51.... | 128 |
| Bank 0, buffer 1 (120) | LBAs 4, 20, 36, 52.... | 129 |
| | | 130 |
| | | 131 |
| 0x8000 | | 132 |
| Bank 1, buffer 0 (122) | | 133 |
| | | 134 |
| | | 135 |
| 0xC000 | | 136 |
| Bank 1, buffer 1 (123) | | 137 |
| | | 138 |
| | LBAs 14, 30, 46, 62.... | 139 |
| | LBAs 15, 31, 47, 63.... | 140 |

115, 117

I/O CHANNEL SCRAMBLING/ECC DISASSOCIATED COMMUNICATION PROTOCOL

CROSS-REFERENCE TO RELATED APPLICATION

This application claims the priority benefit under 35 U.S.C. § 119(e) of U.S. Provisional Application No. 62/158,420 filed on May 7, 2015, the disclosure of which is incorporated herein by reference in its entirety.

TECHNICAL FIELD

The present disclosure generally relates to memories. More specifically, and not by way of limitation, particular embodiments of the inventive aspects disclosed in the present disclosure are directed to an Input/Output (I/O) channel communication protocol that can work with a variety of encoding approaches such as, for example, scrambling, bit/byte swizzling/steering, Error Correction Code (ECC) based coding, and other data protection/coding schemes.

BACKGROUND

A computing system may employ many different types of semiconductor memories communicating with a Central Processing Unit (CPU) or a memory controller through different types of buses. These memories may include volatile as well as non-volatile memories. The volatile storage may be provided by a Random Access Memory (RAM) such as, for example, one or more DRAM modules. The non-volatile storage, on the other hand, may be provided by a Solid State Drive (SSD), flash memories on Universal Serial Bus (USB) drives or on Secure Digital (SD) or microSD memory cards, and the like. The different types of buses may be part of the motherboard of the computing system, and provide physical connections to the respective memories to allow communication of relevant information—such as, for example, commands, addresses, data, and status information—throughout the system.

Typically, different Input/Output (I/O) buses generally support different data bandwidths. For example, a main memory bus or a system memory I/O bus that connects the CPU to the system memory—such as, for example, the DRAM modules—can support a significantly higher data bandwidth than that supported by another I/O bus (which also may be referred to as an "expansion bus"). The system bus supporting communication with DRAM modules may be interchangeably referred to as a "DRAM bus," a "DRAM interface," a "DRAM memory interface," or a "DRAM channel." There may be many different types of other I/O buses in a computing system. Some I/O buses include, for example, a Peripheral Component Interconnect (PCI) bus, PCI Express (PCI-E or PCIe) bus, a USB bus, a Serial Advanced Technology Attachment (SATA) bus, and so on. Generally, non-volatile storage devices may be connected to respective I/O buses. For example, a USB drive may be connected to a USB bus, and an SSD drive may be connected to a SATA bus.

It is understood that each communication bus—whether a system memory bus or another I/O bus—provides an interface that supports a specific type of communication protocol that is uniquely defined and standardized for that bus and the memories that connect to that bus. For example, the JEDEC Solid State Technology Association, formerly known as the Joint Electron Device Engineering Council (JEDEC), is an independent semiconductor engineering trade organization and standardization body that has adopted and established open standards for DRAMs such as, for example, Double Data Rate 2, 3, or 4 (DDR2/DDR3/DDR4) Synchronous DRAM (SDRAM) memories. Such standards may specify memory pinout and the memory bus interface configuration—including address and data bus configurations, as well as the communication protocol over the relevant DRAM interface such as, for example, memory reset and initialization procedures, timing requirements for various memory operations, formats of various memory command and status data, different memory read and write modes, and so on. One advantage of such standardization is that memory modules manufactured by third party vendors in compliance with the relevant standards may be used in any computing system so long as the corresponding memory buses in the computing system are designed to support the respective standardized protocols. However, on the flip side, the standardized memory interfaces may prevent a memory module designed for one type of communication bus to be installed or connected with another type of communication bus. For example, a device (e.g., a USB memory) designed to operate with a USB bus may not be connected to a SATA bus, and vice versa.

SUMMARY

In one embodiment, the present disclosure is directed to a method that comprises: (i) detecting that a storage device is attached to an Input/Output (I/O) interface supported by a host; (ii) in response to the detection, instructing the host to write a sequence of data patterns to the storage device using the I/O interface, wherein a data pattern in the sequence includes an encoded version of a respective command data, and wherein the data pattern in the sequence is written a pre-determined number of times before a next data pattern in the sequence is written to the storage device; (iii) storing a command data-containing portion of the written data pattern in an addressable storage in the storage device; (iv) receiving, at the storage device, a control bit pattern from the host over the I/O interface, wherein the control bit pattern includes an encoded I/O command; and (v) using one or more command data-containing portions in the addressable storage to decode the I/O command received through the control bit pattern.

In another embodiment, the present disclosure is directed to a method that comprises: (i) configuring a storage device to be attachable to and operable through an I/O interface supported by a host, wherein the storage device is configured to store data received from the host in a plurality of buffers within the storage device; (ii) receiving, at the storage device, the following from the host via the I/O interface: a memory-mapped buffer address of one of the plurality of buffers, and an encoded version of a memory page of data; (iii) storing the encoded version of the received data into the buffer having the memory-mapped buffer address; (iv) receiving an instruction from the host to read a content stored at the memory-mapped buffer address; and (v) in response to receiving the instruction, providing the stored encoded version of the received data to the host via the I/O interface.

In another embodiment, the present disclosure is directed to a memory module, which comprises: (i) a first storage portion; (ii) an interface unit; (iii) a second storage portion; and (iv) a control unit coupled to the first storage portion, the interface unit, and the second storage portion. The first storage portion in the memory module includes a plurality of memory units to store content. The interface unit is configured to allow the memory module to be attached to and operable through an I/O interface supported by a host. Upon attachment of the memory module to the I/O interface, the control unit in the memory module is operative to: (i) receive from the host a sequence of data patterns over the I/O interface, wherein a data pattern in the sequence includes an encoded version of a respective command data, and wherein the data pattern in the sequence is received from the host a pre-determined number of times before a next data pattern in the sequence is received; (ii) store a command data-containing portion of the written data pattern in the second storage portion; (iii) receive a control bit pattern from the host over the I/O interface, wherein the control bit pattern includes an encoded I/O command; and (iv) use one or more command data-containing portions in the second storage portion to decode the I/O command received through the control bit pattern.

In a further embodiment, the present disclosure is directed to a system, which comprises: (i) an I/O interface supporting communication of electronic content therethrough in a transmission format defined therefor; (ii) a processor coupled to the I/O interface and supporting communication of electronic content over the I/O interface; (iii) a storage device coupled to the I/O interface; and (iv) a device driver associated with the storage device. In the system, the device driver contains program instructions, which, when executed by the processor, cause the processor to perform the following: (i) detect that the storage device is attached to the I/O interface; and (ii) write a sequence of data patterns to the storage device using the I/O interface, wherein a data pattern in the sequence includes an encoded version of a respective command data, and wherein the data pattern in the sequence is written a pre-determined number of times before a next data pattern in the sequence is written to the storage device. Furthermore, in the system, the storage device is operable through the device driver to perform the following: (i) store a command data-containing portion of the data pattern in an addressable storage in the storage device; (ii) receive a control bit pattern from the processor over the I/O interface, wherein the control bit pattern includes an encoded I/O command; and (iii) use one or more command data-containing portions in the addressable storage to decode the I/O command received through the control bit pattern.

BRIEF DESCRIPTION OF THE DRAWINGS

In the following section, the inventive aspects of the present disclosure will be described with reference to exemplary embodiments illustrated in the figures, in which:

FIG. 8 illustrates how non-volatile memory in the storage device of FIGS. 1-2 may be "organized" using appropriate address mapping and set-associativity to store user data according to particular embodiments of the present disclosure.

DETAILED DESCRIPTION

Figure 1:
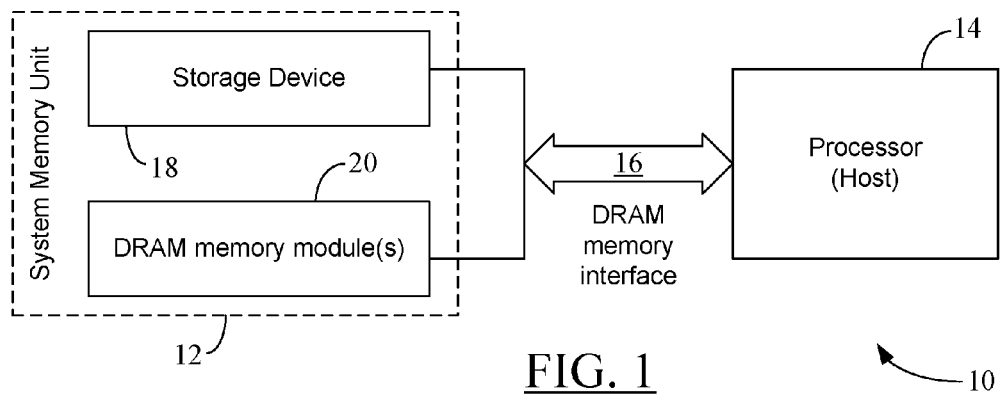
FIG. 1 shows a highly simplified, partial layout of a system according to one embodiment of the present disclosure.

In the following detailed description, numerous specific details are set forth in order to provide a thorough understanding of the disclosure. However, it will be understood by those skilled in the art that the disclosed inventive aspects may be practiced without these specific details. In other instances, well-known methods, procedures, components and circuits have not been described in detail so as not to obscure the present disclosure. Additionally, the described inventive aspects can be implemented with any semiconductor-based storage system that is configured to connect to a DRAM memory interface, regardless of whether the storage system primarily contains non-volatile memory or has a hybrid storage configuration with volatile and non-volatile memory units.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "pre-determined," "form-factor", "block-based," etc.) may be occasionally interchangeably used with its non-hyphenated version (e.g., "predetermined," "form factor", "block based," etc.), and a capitalized entry (e.g., "SSD," "Control Register," "Non-Volatile," etc.) may be interchangeably used with its non-capitalized version (e.g., "ssd," "control register," "non-volatile," etc.). Such occasional interchangeable uses shall not be considered inconsistent with each other.

It is noted at the outset that the terms "coupled," "operatively coupled," "connected", "connecting," "electrically connected," etc., may be used interchangeably herein to generally refer to the condition of being electrically/electronically connected in an operative manner. Similarly, a first entity is considered to be in "communication" with a second entity (or entities) when the first entity electrically sends and/or receives (whether through wireline or wireless means) information signals (whether containing address, data, or control/status information) to/from the second entity regardless of the type (analog or digital) of those signals. It is further noted that various figures (including component diagrams) shown and discussed herein are for illustrative purpose only, and are not drawn to scale.

The terms "first," "second," etc., as used herein, are used as labels for nouns that they precede, and do not imply any type of ordering (e.g., spatial, temporal, logical, etc.) unless explicitly defined as such.

As noted earlier, a main memory bus or a system memory bus that connects the CPU to the system memory—such as, for example, the DRAM modules—can support a significantly higher data bandwidth than that supported by another I/O bus. Thus, the lower bandwidths supported by slower I/O buses often create communication bottlenecks for I/O storage devices that are capable of operating at much higher speeds. One such storage device is an SSD, which is a block-based storage device providing non-volatile storage of content. An SSD is an I/O device that is able to operate at higher bandwidths and, hence, it may be desirable to connect the SSD to the faster system memory bus as opposed to other slower I/O bus. As a result, I/O capabilities and performance (both throughput and latency) may be significantly enhanced.

However, as also mentioned earlier, the standardized memory interfaces may prevent a memory module designed for one type of I/O communication bus to be installed or connected with other type of I/O communication bus. For example, to overcome such restrictions, the physical connectivity of a SATA-based SSD drive may be modified for DDR memory channel connectivity to comply with JEDEC-standardized Dual In-line Memory Module (DIMM) form-factor for attachment to a DRAM memory channel. Although such modification may make the SSD drive insertable into (or compatible with) a standard DIMM memory slot typically used for conventional DRAM modules, it alone is still not sufficient to make the SSD drive operable using the JEDEC-defined communication protocol for the DRAM interface. One reason for such inoperability is that the DRAM channel DIMM form-factor SSD—also referred to herein as a "DIMM-based SSD" for the sake of brevity—is a block-based storage device, which may not show up in the host's DRAM memory map. Even if the host "recognizes" the DIMM-based SSD as a Registered DIMM (RDIMM), an Unregistered DIMM (UDIMM), a Load Reduced DIMM (LRDIMM), or any other type of DIMM, the DIMM-based SSD may still need to be able to "comprehend" the DRAM channel communication protocol used by the host. Thus, the DIMM-based SSD may need to "understand" the data—whether control data or user data—received from the host in a transmission format defined for the DRAM interface, and correspondingly generate responses—such as, for example, status data—also in the transmission format defined for the DRAM interface so as to establish a fully functional, bi-directional communication "link" with the host. In this context, the DIMM-based SSD may be considered a "non-standardized usage storage device" because it is not standardized for use with a different type of I/O channel—here, a DRAM channel, even though the device is made physically compatible for attachment to such other type of I/O channel. Thus, in general, a "non-standardized usage storage device," like a DIMM-based SSD, may have been standardized for use with one type of I/O channel—like a SATA bus or a PCIe bus, but may not have been standardized for use with another type of I/O channel—like a DRAM channel.

A problem may arise when encoding is employed in the system for data communications on an I/O channel, such as a DRAM channel. It is noted at the outset that, for the sake of brevity and ease of discussion, the term "encoding" is used herein as an umbrella term to refer to various data protection/coding schemes such as, for example, scrambling, bit/byte swizzling/steering (which may re-organize or re-order data for faster processing or speedy storage), Error Correction Code (ECC) based coding, data interleaving, and so on. The encoding may be performed by a host, or a host platform-based memory controller, or any other processing entity in the host. It is understood that a single system may not necessarily employ all of these coding schemes. Alternatively, the system may employ a data protection scheme other than those mentioned here. In any event, like the term "encoding," the term "encoded data" (or other terms of similar import) also may be used herein as an umbrella term to refer to data—such as, for example, control/command data, status data, and user data—that is encoded using one or more of the data protection/coding schemes mentioned above and communicated over an I/O channel, like a DRAM channel, in a transmission format defined/standardized for that I/O channel.

When encoding is present on a standardized I/O channel (like a DRAM channel), a storage device that is not standardized for that I/O channel but attached to it—like the earlier-mentioned DIMM-based SSD—needs to be "aware" of the underlying encoding scheme so as to be able to decode the received commands and user data, and correctly report the status information back to the host in the same encoding format that was applied by the host (or host memory controller). However, it is difficult to reverse engineer encoding algorithms. Furthermore, even if the algorithms are known, their implementations may vary from one computer vendor/platform to another. For example, some platforms may use a random seed generated at boot time for the scrambler. Unless the platform allows this per-boot randomization feature to be disabled, such randomized scrambling may be difficult to reverse engineer. In any event, using a DIMM-based SSD as an example, it is observed that it may not be feasible to provide a DIMM-based SSD that is aware of DRAM channel encoding schemes implemented by each conceivable computer vendor/platform.

It is therefore desirable to devise a mechanism to implement a non-standardized usage storage device, like a DRAM memory channel DIMM form-factor SSD, on a standardized I/O channel (like a DDR DRAM channel), without the need to know or reverse engineer the encoding methods or algorithms applied by the host platform memory controller for that standardized I/O channel. Using a DIMM-based SSD as an example, it is noted that, because the DIMM-based SSD is different from the standard DRAMs, it is further desirable that the host be able to send control information to the DIMM-based SSD and receive status information from the SSD in a host-recognizable manner, regardless of the encoding or data protection schemes used on the DDR channel.

In particular embodiments, the present disclosure provides a protocol that enables communication between a host system and a DDR form-factor SSD without the need to reverse engineer the encoding methods or algorithms applied by the host. Thus, the protocol described herein may work with a variety of scrambling, ECC, and other data protection schemes. Hence, the protocol may be generally applied to any encoded I/O interface including, for example, any application where a DIMM-based storage device is attached on a DDR channel and needs to exchange information with a host.

A brief overview of the communication protocol according to particular embodiments of the present disclosure is provided below. More details are given later during discussion of FIGS. 3-8. Before continuing further, it is noted here that, for the sake of simplicity and ease of discussion, a DIMM-based SSD is used merely as an example throughout the discussion herein to illustrate the inventive aspects of the teachings of the present disclosure, without any loss of generality. In other words, the teachings of the present disclosure apply to applications where encoded communication between a host and an I/O storage device is to be carried out over a standardized I/O interface linking the host and the storage device, but the storage device is not standardized for that specific I/O interface. Thus, the teachings of the present disclosure allow a non-standardized usage storage device to be attached to and operable over a standardized I/O communication channel where encoding is present. For example, a PCIe-based SSD drive may be considered a "standardized storage device" when connected to a PCIe interface. However, such SSD drive may be a "non-standardized usage storage device" when connected to another I/O interface, like a JEDEC-defined DRAM interface. In that case, in addition to modifying the physical connectivity of the SSD drive to make the drive attachable to the DRAM channel using a standard DIMM slot, it also may be desirable to enable the DIMM-based SSD to communicate with its host without the need for the SSD to know or reverse engineer the encoding methods or scrambling algorithms applied by the host.

The present disclosure provides exemplary mechanisms to facilitate such encoded communication between a non-standardized usage I/O storage device and its host over a standardized I/O channel. Thus, in the discussion herein, a DRAM interface (or DRAM channel), like the DRAM interface 16 in FIG. 1, is used as an example of a standardized I/O interface (or I/O channel), and the encoded DRAM commands communicated over such DRAM interface are examples of the encoded I/O commands a non-standardized usage storage device, such as the storage device 18 in FIG. 1, may need to "interpret" as per teachings of the present disclosure to be able to communicate with a host, like the host 14 in FIG. 1. For the sake of brevity, all possible implementations of non-standardized usage storage devices with their respective (standardized) I/O interfaces are not discussed below. However, the details provided below using the example of a DIMM-based SSD remain applicable to various such arrangements. Hence, in the discussion herein, frequent use of the more specific terms like "DRAM interface," "DRAM channel," and "DRAM command," in place of corresponding general terms like "I/O interface," "I/O channel," and "I/O command," should not be construed as limiting the applicability of the teachings of the present disclosure only to a DIMM-based SSD connected to a standardized DRAM channel. Rather, the communication protocol and data storage configuration discussed with reference to the exemplary embodiments in FIGS. 1-9 of the present disclosure may apply, with suitable modifications (if needed), to other types of I/O storage devices and other types of standardized I/O interfaces as well.

Data exchanges with DIMM-based SSDs may fall into two categories: (i) Control/Status Data, and (ii) User Data. If host-based encoding is present, then the control data may need to be "decoded" and understood by the DRAM memory channel-based SSD. On the other hand, the status data may need to be created by the SSD in the appropriate encoding format to enable the host to decode it. In particular embodiments, to enable the transfer of control/status data, the host may: (i) write a command descriptor or value to one or more registers in the DIMM-based SSD, and (ii) read a status indicator back from one or more registers. In particular embodiments, the user data can be stored directly—including any host-supplied encoding such as, for example, scrambling and/or ECC—in the flash memory in the SSD. Because the user data is stored in the SSD in an as-received condition and without any modification of the host's encoding, it can be read back unaltered later whenever a memory read operation is performed by the host. Such unaltered data, in turn, is easily "recognized" by the host and decoded as per host's encoding algorithm.

More generally, in particular embodiments, the control/status data may be written to the DIMM-based SSD drive by sending a protocol training sequence of known values and storing the associated command/status data—in the format received from the host—in a CAM/register at the DIMM-based SSD. To interpret future control data after training, the DIMM-based SSD may utilize a CAM lookup of the received data versus the previously-trained values to determine the meaning of the current encoded command received from the host (as part of the control data). The SSD may also retrieve the appropriate status data stored in one of its registers using the register index lookup, and then report the status data to the host. In one embodiment, during the training phase, multiple control data sequences can be sent from the host to create a complete command descriptor in the DIMM-based SSD. In another embodiment, multiple status data sequences may be sent as well during the training phase.

The block-based data storage approach in an SSD is completely different from the memory bank selection based storage in a conventional DDR channel DRAM. Hence, the user data may be written to/read from the DIMM-based SSD using a slightly different approach. Because of the address component in the host memory controller's data scrambling algorithm, in one embodiment, the writes and reads of a given Logical Block Address (LBA) may need to be done through the same physically addressed region in the DRAM memory channel SSD. This can be accomplished by associating the LBA with a given physically-addressed buffer(s) and only writing and reading that LBA through the given buffer. On the other hand, when the host memory controller employs a scrambling scheme with no address dependency, the user data can be written to and read from any buffer address in the DIMM-based SSD.

FIG. 1 shows a highly simplified, partial layout of a system 10 according to one embodiment of the present disclosure. As shown, the system 10 may include a system memory unit 12 connected to and in communication with a processor or host 14 via an I/O interface, such as a DRAM memory interface 16. The system 10 may be a computer system (desktop or laptop), a tablet computer, a mobile device, a video gaming unit or console, or any other type of computing or data processing device having an I/O interface, like the DRAM interface 16. In various embodiments, the system 10 may be a rack-mountable server system, a standalone system, or in any other suitable form factor. In some embodiments, the system 10 may be configured as a client system rather than a server system.

In the discussion herein, the term "system memory" is used to refer to memory module(s) that are in communication with the host 14 via the DRAM interface 16. Thus, a system memory module may be distinguished from another I/O memory device/module—such as a USB drive, a hard drive, a SATA drive, and the like—connected to the processor 14 via an I/O bus such as a USB bus, a SATA bus, a PCIe bus, and the like. It is noted, however, that the term "system memory" does not necessarily imply that the system memory is located physically closer to the host 14 than another non-system I/O memory. In any event, for ease of discussion and drawing, various bus bridges or bus controllers connecting system memories and other I/O memories to the processor 14 are not shown in FIG. 1 or in any of the other figures. It is, however, understood that there may be additional control units—like bus bridges or bus arbiters—between the system memory unit 12 and the processor 14. As shown, in one embodiment, the system memory unit 12 may include a storage device 18 and one or more DRAM memory modules 20. In case of the DRAM memory 20, details such as the type of the DRAM memory, the number of DRAM memory modules, the number of memory chips per DRAM module, the number of memory banks per chip and the internal configuration of memory banks in a chip, or the storage capacity of each chip, are not relevant and, hence, such details are not provided herein. In particular embodiments, the inventive aspects of the present disclosure may be implemented in and with reference to the storage device 18. Therefore, the storage device 18 is discussed in more detail below and with reference to FIG. 2.

It is noted here that the term "storage device," as used herein, refers to any semiconductor memory device that has a pin configuration or physical connectivity which allows the device to be insertable into a DRAM bus-based standard DIMM memory slot typically used for conventional DRAM modules such as, for example, DDR DRAMs. Thus, the storage device 18 as per particular embodiments of the present disclosure may include, for example, the earlier-mentioned DRAM memory channel DIMM form-factor SSD (DIMM-based SSD or DDR form-factor SSD), any block-based storage device having the DIMM form-factor, a storage device configured to operate via the DRAM memory interface 16, and the like. In certain embodiments, the storage device 18 may provide only non-volatile storage and, hence, may include primarily non-volatile memory units such as, for example, flash memories or flash-based storage units, Magnetic RAM (MRAM), Spin-Transfer Torque MRAM (STT-MRAM), Phase-Change Random Access Memory (PRAM or PCRAM), Resistive Random Access Memory (RRAM or ReRAM), Conductive-Bridging RAM (CBRAM), and the like. Alternatively, in certain other embodiments, the storage device 18 may provide a hybrid storage—non-volatile as well as volatile—and, hence, may include both volatile and non-volatile memory units. An example of such a hybrid storage device is a Non-Volatile DIMM (NVDIMM) that contains DRAM as well as flash memory units. In still other embodiments, the storage device 18 may be a conventional DDR2/DDR3/DDR4 DRAM module, or a DRAM-based Three Dimensional Stack (3DS) memory module such as, for example, a High Bandwidth Memory (HBM) module, or a Hybrid Memory Cube (HMC) memory module. In particular embodiments, the type of the memory module constituting the "storage device" 18 may be irrelevant because the protocol according to the teachings of the present disclosure may be implemented with any memory module that is attachable to and operable through the DRAM channel 16 supported by the host 14.

It is noted here that, in one embodiment, only the storage device 18 may comprise the system memory unit 12. There may not be any additional DRAM modules 20 in that embodiment. In another embodiment, the storage device 18 may include more than one memory module—all may be of the same type or may be of different types—under operative control of the processor 14. Furthermore, it is understood that the units shown as part of the system 10 in FIGS. 1-2 or in FIG. 9 may themselves contain may other complex components. However, such components are not illustrated in these figures because of their lack of relevance to the present disclosure.

The system memory bus or DRAM bus 16 between the memory unit 12 and the external host 14 may provide a wide, high-speed local I/O bus for data movement between the memory unit 12 and the host 14. In particular embodiments, the DRAM bus or DRAM interface 16 may provide a signaling channel that transports control, status, and user data between the processor 14 and the system memory 12 in compliance with the relevant JEDEC-defined DRAM channel communication protocol(s) supported by the host 14. In particular embodiments, during the training phase as well as thereafter, the data bus portion of the DRAM interface 16 may be used to exchange the command, status, and user data between the storage device 18 and the host 14, as discussed below.

Figure 2:
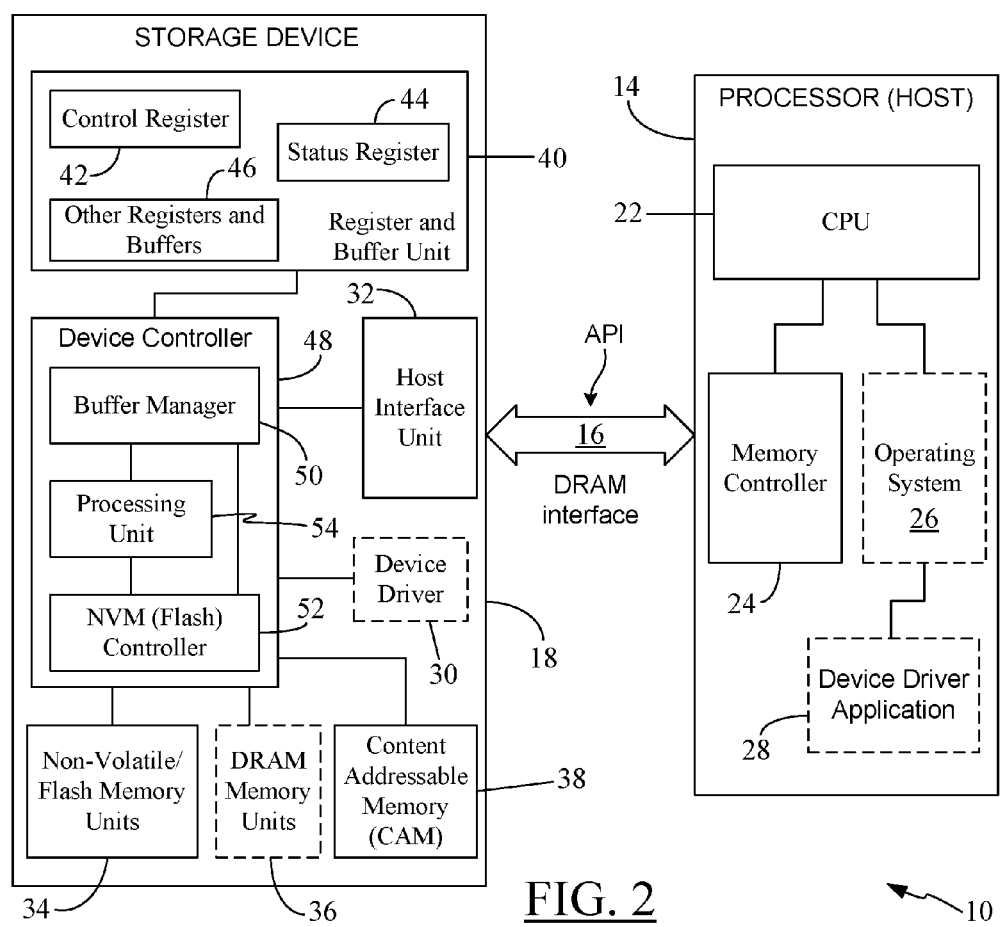
FIG. 2 shows another embodiment of the system in FIG. 1, with exemplary architectural details of the storage device and the host processor depicted in FIG. 1.

FIG. 2 shows another embodiment of the system 10 in FIG. 1, with exemplary architectural details of the storage device 18 and the host processor 14 depicted in FIG. 1. It is understood that in certain embodiments the storage device 18 may include more or less components than those shown in FIG. 2. However, for ease of reference, some of the more relevant components are shown and discussed with reference to FIG. 2. As shown, the host 14 may include a CPU 22 in communication with a memory controller 24. In one embodiment, the CPU may be a general purpose microprocessor. In the discussion herein, the terms "processor" and "CPU" may be used interchangeably for ease of discussion. However, it is understood that, instead of or in addition to the CPU 22, the processor/host 14 may contain any other type of processors such as, for example, a microcontroller, a Digital Signal Processor (DSP), a Graphics Processing Unit (GPU), a dedicated Application Specific Integrated Circuit (ASIC) processor, a Field Programmable Gate Array (FPGA), and the like. Furthermore, in one embodiment, the processor/host 14 may include more than one CPU. The processor 14 may be configured to execute instructions and to process data according to a particular Instruction Set Architecture (ISA) such as, for example, an x86 instruction set architecture (32-bit or 64-bit versions), a PowerPC® ISA, or a MIPS (Microprocessor without Interlocked Pipeline Stages) instruction set architecture relying on RISC (Reduced Instruction Set Computer) ISA. In one embodiment, the host 14 may be a System on Chip (SoC) having functionalities in addition to a processor or CPU functionality. In that embodiment, for example, the memory controller functionality may be integrated into the SoC. Alternatively, the memory controller may be integrated with the CPU 22 in particular embodiments.

Generally, the memory controller 24 may manage the data exchange between the host/processor 14 and the system memory unit 12. Thus, in particular embodiments, all transfers of data and control information between the storage device 18 and the host 14 may pass through and be controlled by the memory controller 24. In one embodiment, the memory controller 24 may be configured to encode the data to be sent to the storage device 18 over the DRAM interface 16. Such encoding may include, for example, scrambling, ECC, bit/byte swizzling/steering, and/or any other data protection scheme being implemented in the system 10. Similarly, the memory controller 24 may also decode the data being received from the storage device 18 before sending the decoded data to the CPU 22 for further processing. In alternative embodiments, such encoding and decoding may be performed by the CPU 22 itself, in which case, the memory controller 24 may simply manage the memory selection, transmission of CPU-encoded data to the storage device 18, reception of encoded data from the storage device 18, memory mapping, and other control operations to facilitate CPU's communication with various memory modules in the system memory unit 12.

As shown in FIG. 2, the host 14 may store or operate on the program code associated with an Operating System (OS), which is shown by a dotted block and identified using the reference numeral "26." The operating system 26 may be a Microsoft® Windows® based operating system, an Apple® Mac OS® or OS X® based operating system, an open source based operating system like Linux®, and the like. The details of the storage, execution, type, and management of the operating system software 26 are not relevant to the present disclosure and, hence, are not provided herein.

In one embodiment, the interaction between the storage device 18 and the host 14 may be facilitated via a device driver 28 application or software associated with the storage device 18. The driver software 28 may be managed by the operating system 26 and executed by the CPU 22. In one embodiment, upon execution of the device driver software 28 by the CPU 22, the host 14 may be configured to perform various method steps discussed later with reference to FIGS. 3-4 and 7. Thus, the communication protocol according to the teachings of the present disclosure may be implemented through execution of the device driver 28 by the host 14. In one embodiment, the device driver 28 may be provided as part of the operating system software 26. In another embodiment, the driver software 28 may be downloaded from an external source such as, for example, from a website of the manufacturer/developer of the storage device 18. In yet another embodiment, the device driver 28 may be a part of the system Basic Input Output System (BIOS). In a further embodiment, the device driver 28 may be provided to the host 14 by the storage device 18 itself, for example, when the storage device 18 is initially installed in the system 10 such as, for example, at the time of power-up or when the system 10 is booted using a BIOS. In that case, the device driver may be stored/supplied on the storage device 18. As symbolically illustrated in FIG. 2, an Application Programming Interface (API) may be provided to the host 14 over the DRAM interface 16 when the storage device 18 is initially installed. The host 14 may use the API for initiation of the device training phase (discussed later) as well as to execute the driver software 28 to manage the memory operations on the device 18. In one embodiment, such training and other operations may be performed through writes and reads to one or more pre-defined storage locations in the device 18 as discussed later. For example, in one embodiment, the API may expose a control register and a status register in the device 18 as two such pre-defined storage locations. In any event, as shown in FIG. 2, the storage device 18 may also contain at least some portion of the device driver software—indicated using the dotted block 30—to facilitate storage device's communication and interaction with the host 14 through the host-based device driver 28.

The storage device 18 may include a host interface unit 32 that provides an electrical interface with the high-speed, large bandwidth DRAM channel 16 to facilitate data transfer/movement between the storage device 18 and the host 14. In particular embodiments, the basic addressing and "handshaking" between the storage device 18 and the host 14 may be done in the hardware using the interface unit 32 under the operative control of the device driver 28 and/or device driver 30. As mentioned earlier, even though the storage device 18 may have DIMM form-factor, the host interface unit 32 may be operationally different from an interface unit in a conventional DRAM module because the storage device may be a block-based non-volatile memory device that is different from a typical DRAM module with multiple memory banks. However, as discussed later below with reference to FIG. 8, in particular embodiments, a memory bank based configuration may be devised for the storage device 18 even if the device 18 is primarily a block-based storage device. Other types of I/O storage devices may be similarly configured as well.

When the storage device 18 is a non-volatile memory, the data from the host 14 may be stored in a non-volatile storage portion 34, which, in one embodiment, may comprise of a plurality of flash memory units. As noted before, in one embodiment, the storage device 18 may optionally support a hybrid storage model, which provides volatile and non-volatile storage. In that case, the device 18 may also include DRAM memory units as indicated by the dotted block 36. However, despite the presence of DRAM memory units 36, the storage device 18 may still not be a conventional DRAM module, like the DRAM module 20 in FIG. 1. Additional semiconductor storage elements in the storage device 18 may include an addressable storage, such as a CAM 38, and a Register and Buffer Unit (RBU) 40. In one embodiment, the CAM may be a Static RAM (SRAM). Additional operational details of the CAM 38 are provided later with reference to discussion of FIG. 6. In particular embodiments, the CAM 38 may be replaced by other types of addressable storage providing the functionality of content storage and retrieval. The RBU 40 may include one or more control registers 42, one or more status registers 44, and other miscellaneous registers and/or buffers 46. The discussion below primarily focuses on the control register(s) 42 and status register(s) 44 and, hence, additional discussion of registers/buffers 46 is not provided herein. However, it is understood that the registers and buffers 46 may provide additional run-time storage of various parameters or function as a "scratchpad" memory during operation of the device 18. In one embodiment, the storage buffers in the block 46 may be different from the buffered configuration of the non-volatile storage portion 34 discussed later with reference to FIG. 8.

As shown in the embodiment of FIG. 2, the storage device 18 may also include a device controller 48 for operative control of various components in the device 18. The device controller 48 may include a buffer manager 50 to manage reads and writes to various buffers and registers in the RBU 40; and a Non-Volatile Memory (NVM) controller 52 to manage reads and writes to the non-volatile storage portion 34. In one embodiment, the NVM controller 52 may provide a flash memory interface (not shown) that contains internal address buses, data buses, and control buses to manage one or more flash memory units in the storage portion 34. In one embodiment, a processing unit 54 in the device controller 48 may execute firmware-level software to control the operations of the buffer manager 50 and the NVM controller 52, and also to manage the overall operation of the device controller 48 and other circuit components in the device 18—such as, for example, the CAM 38 and the host interface unit 32. In one embodiment, the device controller 48 may be implemented in a combination of hardware, firmware, and/or software. Hence, certain aspects of the functionality of the storage device 18 may be programmable at run-time. Although not shown in FIG. 2, the device controller 48 may also include an Electrically Erasable Programmable Read Only Memory (EEROM) to store the firmware for the device 18. In one embodiment, the EEPROM may also store at least some portion of the device driver software 30. In another embodiment, the device controller 48 may include internal RAM (not shown) that functions as a scratchpad/buffer memory for the processing unit 54 during program execution and for storing scratchpad values. If DRAM memory components—like the DRAM memory unit 36—are also present in the storage device 18, the device controller 48 may also include a DRAM controller (not shown) that contains internal addressing, data bus, and control interface to manage one or more DRAM memory units.

Figure 3:
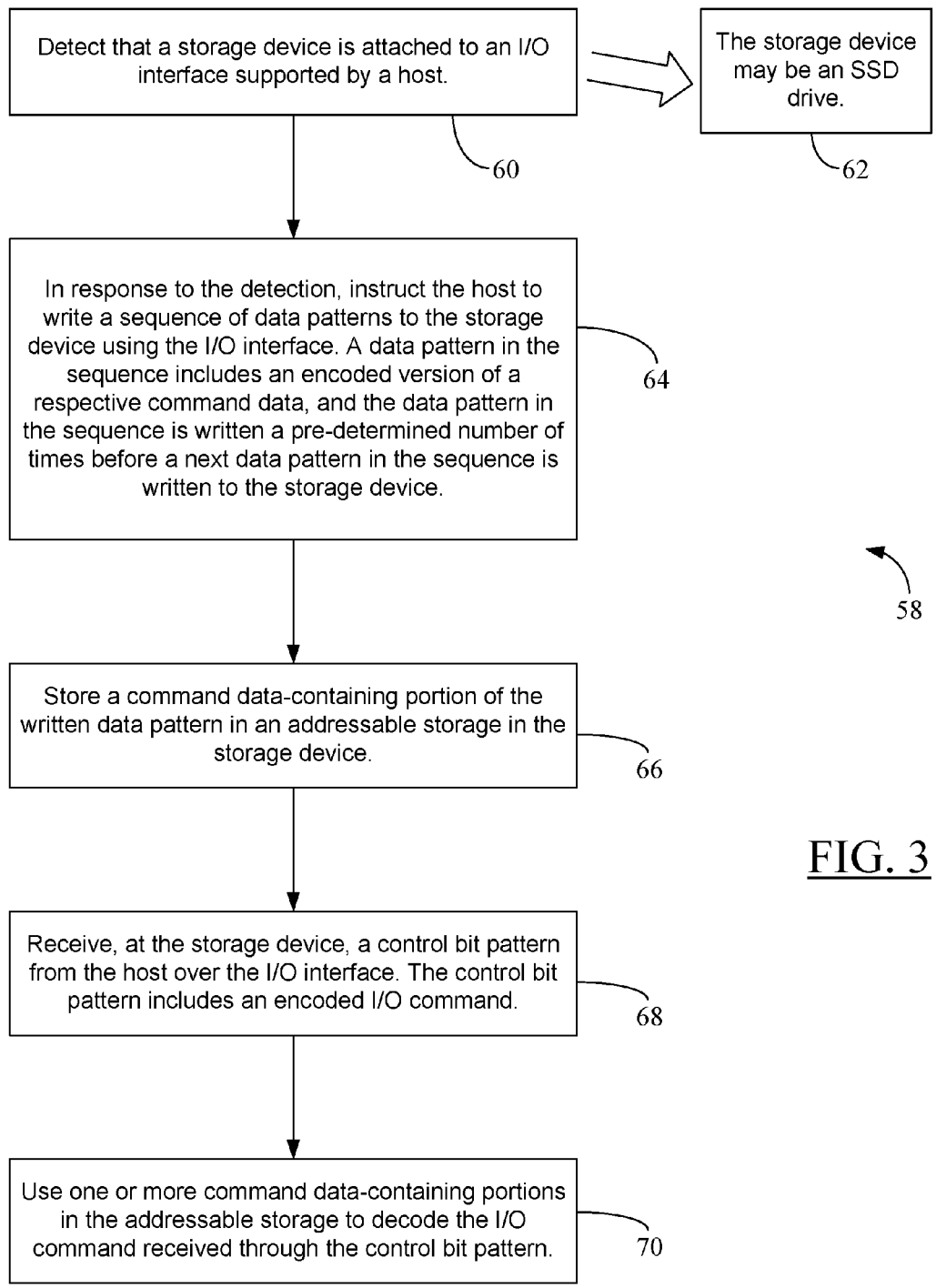
FIG. 3 illustrates an example flowchart of a communication protocol according to one embodiment of the present disclosure showing how a storage device may be trained to "decode" encoded commands received from a host over a DRAM interface.

FIG. 3 illustrates an example flowchart 58 of a communication protocol according to one embodiment of the present disclosure showing how a storage device, such as the storage device 18 in FIGS. 1-2, may be trained to "decode" encoded commands received from a host, such as the host 14 in FIGS. 1-2, over a standardized I/O interface, like the DRAM interface 16 in FIGS. 1-2. Some exemplary JEDEC-defined DRAM channel commands include the memory read command, the memory write command, the no-operation command, the burst terminate command, the row activate command, and so on. The methodology illustrated in FIG. 3 provides a mechanism whereby the storage device 18 can "understand" the encoded commands received from the host 14 via the DRAM channel 16, without performing any reverse engineering of the encoding algorithms employed by the host 14 or without applying any host-specific encoding on its own. The flowchart 58 in FIG. 3 and the flowchart 72 in FIG. 4 (discussed later) provide an overview of the communication protocol according to particular embodiments of the present disclosure. More details of the protocol are provided later with reference to discussion of FIGS. 5-6. In one embodiment, various steps illustrated in the flowchart 58 of FIG. 3 and the flowchart 72 in FIG. 4 may be performed by the combination of the storage device 18 and the host 14, both of which may be under the operative control of the device driver 28 being executed by the host 14. Alternatively, in another embodiment, all of the steps in FIGS. 3-4 may be considered to be performed by the storage device 18 because of the association of the device driver 28 with the storage device 18 and the management of the operations of the storage device by the device driver 28. In any event, in particular embodiments, it may not be necessary to identify the exact entity (in the system 10) performing a specific method step or aspect of the communication protocol according to the teachings of the present disclosure. Hence, such identification may be occasionally omitted in the discussion below.

It is noted here that only the reference numeral "28" is used in the discussion of FIGS. 3-9 to refer to the device driver associated with the storage device 18 and configured to operatively control the storage device 18—as well as certain operations of the host CPU 22 and/or the memory controller 24—when the driver software is executed by the CPU 22. Although, in some embodiments, there may be a reciprocal portion of the device driver resident on the storage device 18—like the device driver module 30 shown in FIG. 2, and although that device driver 30 may communicate/reciprocate with the host-resident driver module 28 to collectively implement the communication protocol according to the teachings of the present disclosure, only the reference numeral "28" is used herein—primarily for ease of discussion—to refer to such combination of driver applications 28, 30.

Figure 4:
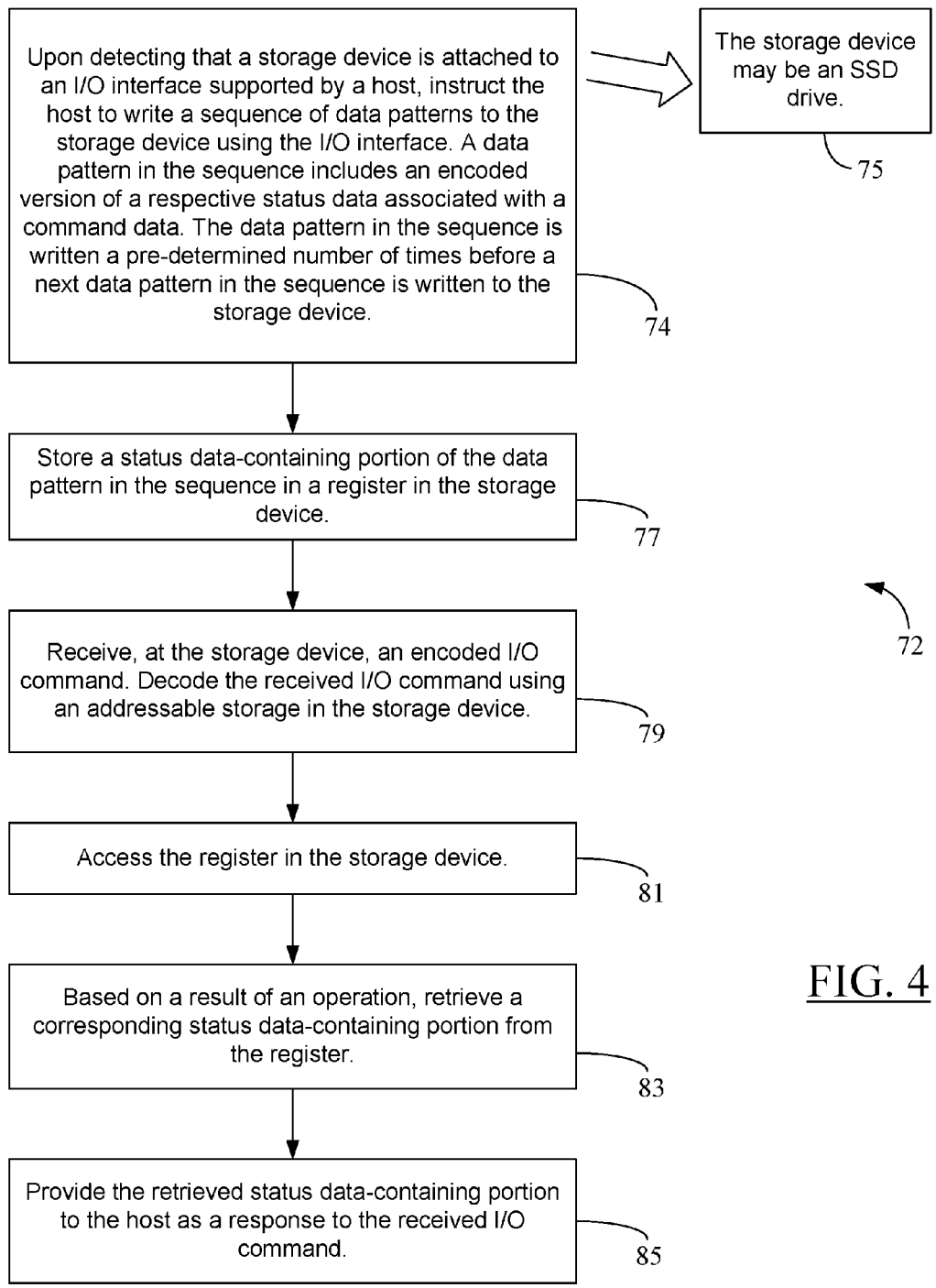
FIG. 4 depicts an example flowchart of a communication protocol according to one embodiment of the present disclosure showing how a storage device may be trained to provide status data associated with a memory operation to a host over a DRAM interface.
Figure 7:
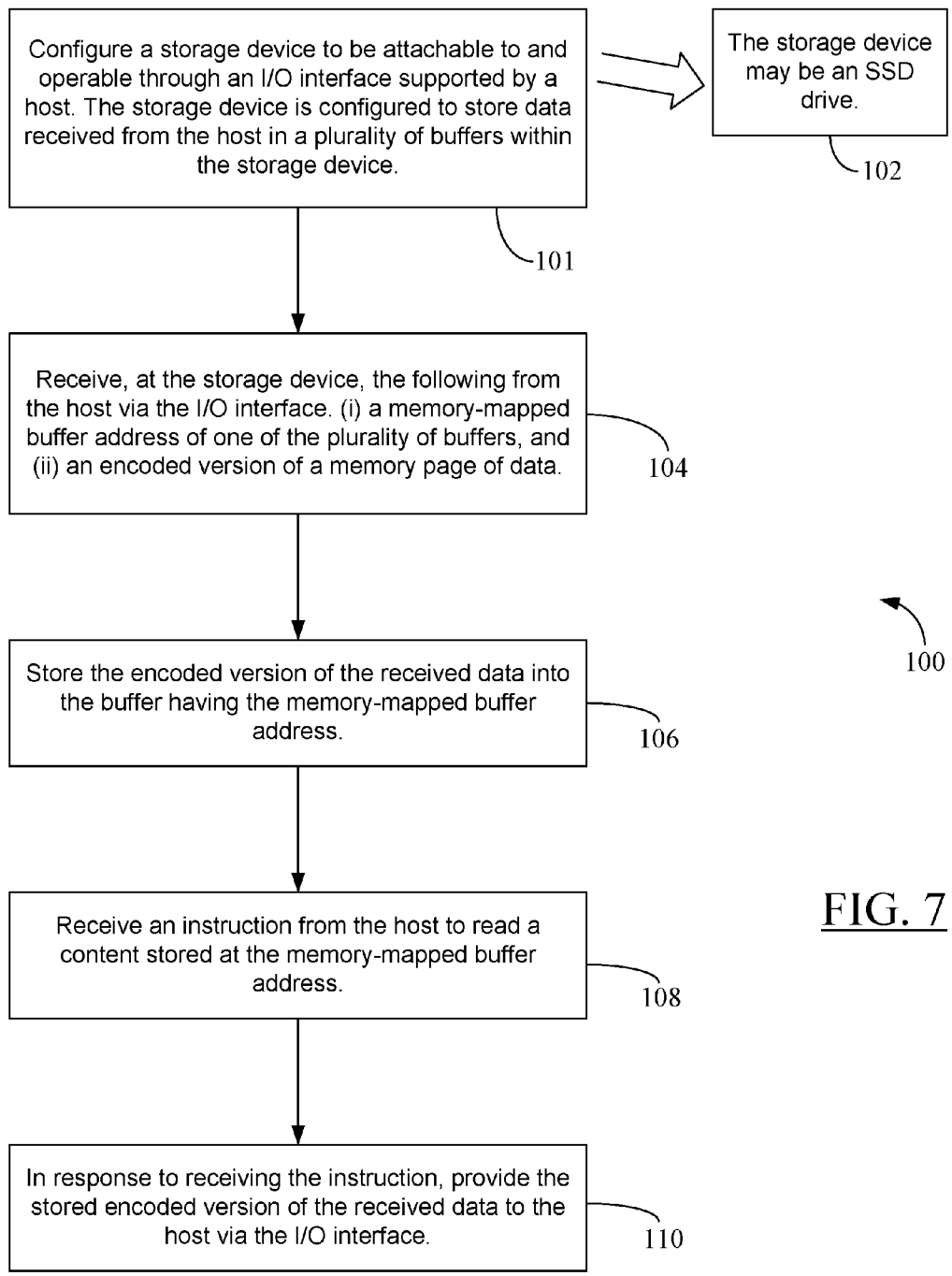
FIG. 7 is an example flowchart illustrating how user data may be stored in the storage device of FIGS. 1-2 according to one embodiment of the present disclosure.

The term "block" as used with reference a method step in FIGS. 3-4 and 7, and also during discussion of other figures, should not be confused with the term "block" as used in the phrases like "block-based storage", "block-based storage device," and the like. The term "block" in the phrase "block-based storage" (and other phrases of similar import) is a term of art and is not used interchangeably with other, non-related appearances of the term "block" in the context of discussion of various figures herein. The term "block"—as in "block-based storage device"—remains distinct, as may be evident from the context of discussion herein.

Referring now to FIG. 3, initially at block 60, the device driver 28 or the host 14 (under operative control of the device driver 28) may detect that the storage device 18 is attached to a standardized I/O interface, such as the DRAM interface 16, supported by the host 14. Such detection may occur, for example, at the time of power-up of the system 10 or when the system 10 is booted, with the device 18 installed in a DRAM channel DIMM slot. As noted at block 62, in one embodiment, the storage device 18 may be a DIMM-based SSD. The protocol training may start, for example, in response to the detection at block 60. As noted at block 64, as part of the protocol training, the device driver 28 may instruct the host 14 to write a sequence of data patterns to the storage device 18 using the I/O interface, such as the DRAM interface 16. Thus, in particular embodiments, the host 14 (or, more specifically, the memory controller 24) may send the data patterns to the storage device 18 in JEDEC-defined transmission formats for the DRAM interface 16. When the host 14 employs encoding, a data pattern in the sequence may include an encoded version of a respective command data. In the communication protocol of the present disclosure, a data pattern in the sequence (at block 64) may be repeatedly written (for example, by the host memory controller 24) a pre-determined number of times—for example, four times—before the next data pattern in the sequence is written to the storage device 18. The device controller 48 in the storage device 18 may be configured (for example, by the device driver 28) to store a command data-containing portion of the written data pattern in the sequence in an addressable storage, such as the CAM 38, in the storage device 18, as noted at block 66. Thus, the command data-containing portion being stored in the CAM 38 may contain the encoded version of the corresponding I/O command, such as a DRAM command issued, for example, by the memory controller 24 in the host 14. Such encoded version is stored in the CAM 38 in an as-received manner—that is, without any reverse engineering or without any modification of the host-specific encoding. As discussed later, the firmware in the device controller 48 may associate a corresponding memory operation with each encoded command stored in the CAM 38. In particular embodiments, the training at blocks 64 and 66 may be performed for each data pattern in the sequence of data patterns received from the host. After this training, the device controller 48 in the storage device 18 may receive—via the host interface unit 32—a control bit pattern from, for example, the memory controller 24 in the host 14. Such control bit pattern may be received at run time and over an I/O interface, such as the DRAM interface 16 (block 68). The received control bit pattern may include an encoded I/O command, such as a DRAM command, which the device controller 48 may need to "decode" for execution. Such "decoding" may be performed as noted at block 70—that is, the device controller 48 may use the earlier-stored command data-containing portions in the addressable storage, such as the CAM 38, to decode the I/O command (such as a DRAM command) received through the control bit pattern at block 68. Thus, the CAM lookup-based "decoding" allows the device controller 48 to identify the received I/O command (such as a DRAM command) and act on it.

FIG. 4 depicts an example flowchart 72 of a communication protocol according to one embodiment of the present disclosure showing how a storage device, such as the storage device 18 in FIGS. 1-2, may be trained to provide status data associated with a memory operation to a host, such as the host 14 in FIGS. 1-2, over an I/O interface, like the DRAM interface 16 in FIGS. 1-2. The flowchart 72 in FIG. 4 may be considered as complementary to the flowchart 58 in FIG. 3 in the sense that the methodology in FIG. 4 relates to training the storage device 18 to provide relevant status data to the host 14 for a memory operation performed in response to the encoded I/O command, such as a DRAM command, received at block 68 in FIG. 3. When the host-based CPU 22 or memory controller 24 performs encoding of the memory commands sent over the DRAM interface 16, it is necessary that the CPU 22 or memory controller 24 "understand" the corresponding status data received from the storage device 18 and further process it. Hence, it is desirable that the storage device 18 be able to supply the status data to the host 14 in an encoding format recognized by the host 14. This may be accomplished in particular embodiments using the protocol training illustrated in FIG. 4.

As noted earlier with reference to block 60 in FIG. 3, the device driver 28 or the host 14 (under operative control of the device driver 28) may detect that the storage device 18 is attached to a standardized I/O interface, such as the DRAM interface 16, supported by the host 14. Upon such detection, the device driver 28 may initiate the protocol training. As indicated at block 74, as part of the protocol training, the device driver 28 may instruct the host 14 to write a sequence of data patterns to the storage device 18 using the I/O interface, such as the DRAM interface 16. Thus, in particular embodiments, the host 14 (or, more specifically, the memory controller 24) may send the data patterns to the storage device 18 in JEDEC-defined transmission formats for the DRAM interface 16. When the host 14 employs encoding, a data pattern in the sequence may include an encoded version of a respective status data associated with a command data. In the communication protocol of the present disclosure, the data pattern in the sequence (at block 74) may be repeatedly written (for example, by the host memory controller 24) a pre-determined number of times—for example, four times—before the next data pattern in the sequence is written to the storage device 18. As noted at block 75, in one embodiment, the storage device 18 may be a DIMM-based SSD. The device controller 48 in the storage device 18 may be configured (for example, by the device driver 28) to store a status data-containing portion of the data pattern in the sequence in a register in the storage device 18, as noted at block 77. Such register may be the status register 44 or any of the other registers 46 as discussed later. Thus, in particular embodiments, each status data is stored in its host-encoded version—that is, without any reverse engineering or without any modification of the host-specific encoding. The firmware in the device controller 48 may associate a corresponding DRAM command with each encoded status data stored in the register at block 77. In particular embodiments, the training at blocks 74 and 77 may be performed for each data pattern in the sequence of data patterns received from the host. After this training at blocks 74 and 77, the device controller 48 in the storage device 18 may receive—via the host interface unit 32—an encoded I/O command (such as a DRAM command) from, for example, the memory controller 24 in the host 14 (block 79). Such command may be received at run time and over the DRAM interface 16. The received encoded command may be "decoded" by the device controller 48 using an addressable storage, like the CAM 38, as explained in the context of the method in the embodiment of FIG. 3. Consequently, the device controller 48 may perform a memory operation—such as, for example, a memory read operation, a memory write operation, and the like—associated with the decoded version of the received DRAM command (block 79). In one embodiment, the device controller 48 may use the buffer manager 50 to access the register where the status data-containing portions are stored at block 77. This aspect is noted at block 81 in FIG. 4. Based on the result of the memory operation—for example, "successful", "failed", "performed", "not performed", "pending", and the like—the device controller 48 may retrieve a corresponding status data-containing portion from the register, as noted at block 83. In one embodiment, the buffer manager 50 may be configured by the controller 48 to use, for example, register index lookup to retrieve appropriate status data-containing portion. Thereafter, at block 85, the device controller 48 may use the host interface unit 32 to provide the retrieved status data-containing portion to the host 14 (for example, the memory controller 24 in the host) as a response to the encoded I/O command (here, a DRAM command) received at block 79. Because the retrieved status data is unaltered from its host-supplied encoded version, the memory controller 24 may easily "recognize" its encoding format and decode/process it accordingly.

FIGS. 3-4 briefly illustrate how the storage device 18 may be trained as part of the communication protocol according to the teachings of the present disclosure to receive the encoded versions of control and status information from the host 14 for decoding of future memory commands and generation of related status information in the host-recognizable encoding format. This training allows the host 14 to be able to send control information to the storage device 18 and receive status information from the device 18 over a standardized I/O interface, such as the standardized DRAM interface 16. The protocol training allows the storage device 18 to "decode" the control data received from the host 14 to execute the encoded memory commands sent by the host 14, and also to "create" corresponding status data to report the execution status of the memory commands to the host 14. As briefly outlined above with reference to FIGS. 3-4, the encoded memory commands may be decoded using the CAM-based lookup approach shown in the flowchart 58 of FIG. 3, whereas the status data may be generated in the host-recognizable encoding format using the register-retrieval approach shown in the flowchart 72 of FIG. 4. Thus, based on the training of the storage device 18, communication between the host 14 and the storage device 18 may be facilitated over the standardized DRAM interface 16 using the DRAM channel-specific control and status data formats.

Figure 5:
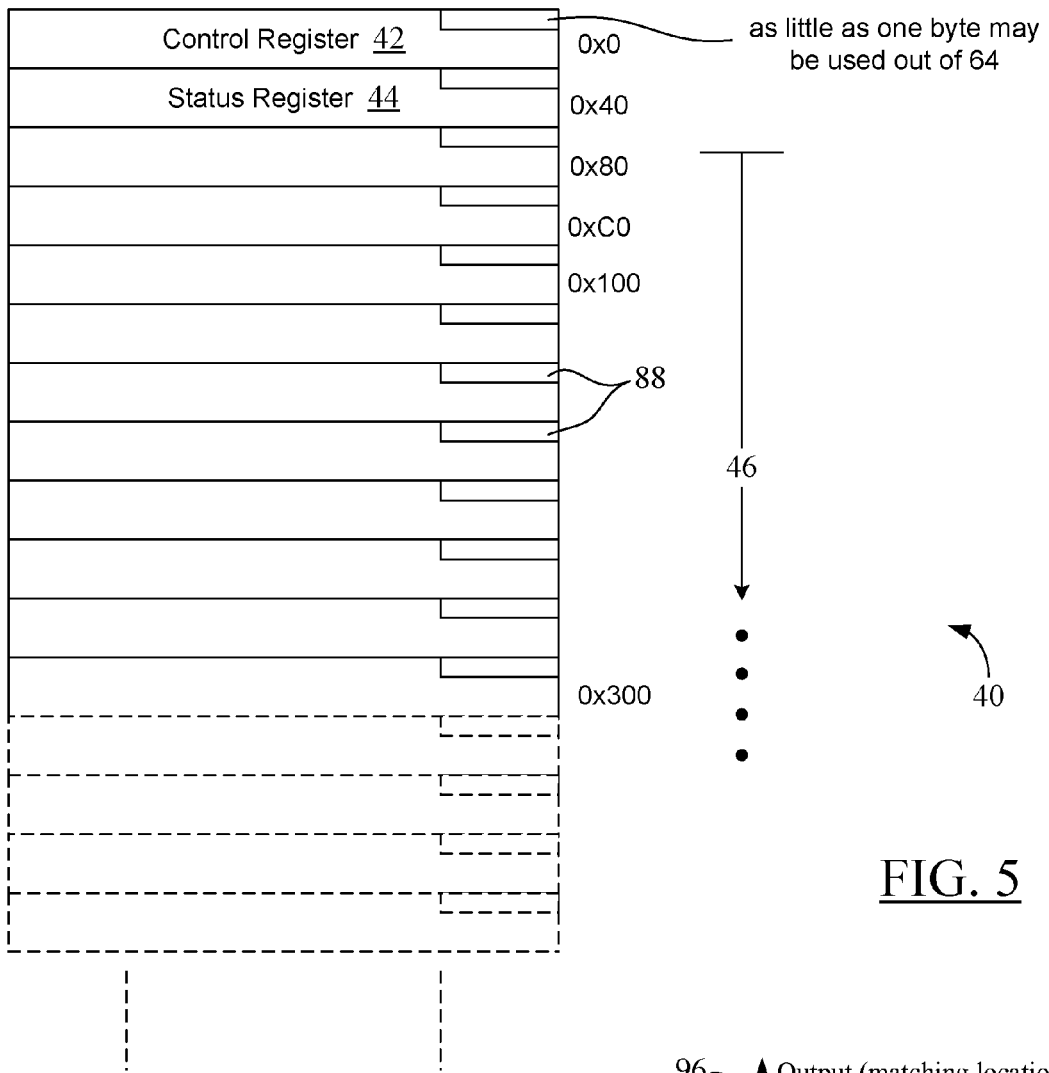
FIG. 5 shows an exemplary register-based storage configuration for control and status data during the protocol training phase according to one embodiment of the present disclosure.
Figure 6:
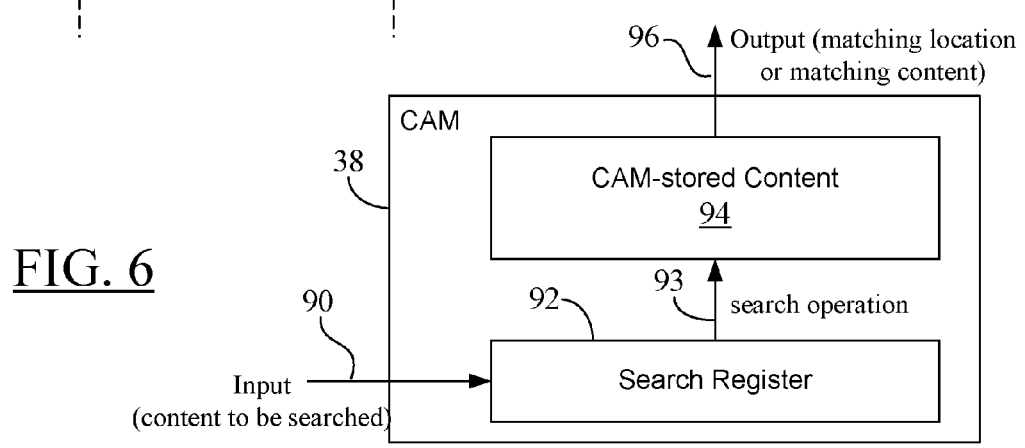
FIG. 6 illustrates a simplified architecture of the CAM in the storage device of FIG. 2 according to one embodiment of the present disclosure.

Prior to discussing the protocol training in the context of FIGS. 5-6, a brief overview of certain additional implementation details is now given. As mentioned before, in particular embodiments, the storage device 18 may be a DRAM memory channel DIMM form-factor SSD, which is a block-based device. Hence, the storage device 18 may not show up in the host's 14 DRAM memory map despite being inserted into a DIMM slot (not shown) on the DRAM interface 16. However, it may be possible—for example, for the device driver 28—to physically address some portion of the storage device, such as the registers and buffers in the RBU 40. Hence, the device driver 28 may translate requests to access the drive 18 into writes and reads to the control/status/data registers (and/or buffers) in the RBU 40. In particular embodiments, the device driver 28 may receive such requests from the operating system 26 or the system BIOS. However, the host memory controller's 24 implementation-specific mapping of DRAM memory channel related chip select, bank selection, and row/column addressing may complicate the physical addressing of the registers/buffers in the RBU 40. However, the firmware in the device controller 48 may be designed to discover—for example, through its interactions with system BIOS during memory test at system boot time—the memory controller's 24 mapping of the relevant memory channel (on which the storage device 18 is installed), chip select, bank selection, and row/column addressing scheme. The device controller 48 may then re-map the discovered addresses so that the internal memory—such as, for example, the registers/buffers in the RBU 40, the non-volatile memory 34, and the volatile memory 36 (if present)—of the storage device 18 is organized into a contiguous address region as seen by the device driver 28. Thus, typical DRAM channel-specific signals—like, chip select, bank selection, row/column address strobes, and the like—may be "aliased" to address (or map onto) the appropriate memory region—non-volatile and volatile (if present)—in the storage device 18. In the discussion below, it is therefore assumed that the step of discovering the memory controller's address mapping and re-mapping that discovered address space for the storage device 18 has been done prior to initiation of the protocol training phase.

It is observed here that, for systems in which BIOS changes to accommodate the storage device 18 are not desired or not possible, a discovery boot loader application may be installed at the host 14 to properly configure the operating system 26 and device driver 28 for operation with the storage device 18. In one embodiment, the discovery boot loader instructions may be performed after the BIOS instructions, but prior to the traditional boot loader instructions. The discovery boot loader may perform the system discovery process to enable the memory controller 24 to properly "recognize" the storage device 18 as a valid memory device. The role of such discovery may be to determine where the storage device 18 fits into the memory controller's 24 memory map, and determine if that mapping can be used by the device driver 28 to operate the storage device 18. The discovery boot loader may modify the BIOS memory map tables (used by the OS 26 for understanding the memory map) to instruct the OS that a specific memory space is reserved for the storage device 18. Once the discovery boot loader has completed its operations and has made proper modifications to the BIOS memory map tables, the traditional boot loader may be launched. In one embodiment, the BIOS may use a mechanism such as Advanced Configuration and Power Interface (ACPI) to communicate the memory map information to the OS 26 and the device driver 28.

In particular embodiments, the control/status protocol training shown in FIGS. 3-4 and discussed in more detail with reference to FIGS. 5-6 may start after the DRAM channel 16 "linking" the host 14 and the storage device 18 has been "trained", and after the mapping of the host's 14 logical address space (used, for example, by the OS 26) to the storage device-based physical address region—as seen by the device driver 28—has been determined (as discussed earlier). In particular embodiments, the "training" of the DRAM channel 16 may include both: (i) the DDR4 JEDEC-defined training, and (ii) the training for Extended Memory Physical Layer (PHY) for DRAM interface. In one embodiment, the system BIOS may perform such training and calibration of the DDR data path/channel 16 between the host 14 and the storage device 18.

To prepare the storage device 18 for the control/status protocol training according to the teachings of the present disclosure, certain additional design considerations may be employed as well. For example, there may be non-volatile storage of necessary "handshake" parameters (discussed later) and mapping information on the storage device 18 itself. Furthermore, initialization of system BIOS, boot loader, or device driver 28 in the presence of the storage device 18 in the system 10 may be performed using a side-band communication method such as, for example, the communication from host 14 to DIMM System Management Bus (SMBus) during Power-On Self-Test (POST) or during Serial Presence Detect (SPD) (if implemented). In one embodiment, the BIOS, boot loader, or device driver 28 may configure the programmable logic in the device controller 48 to prepare the storage device 18 for subsequent control/status protocol training.

The foregoing procedure of device detection, initialization, and address-space mapping may be carried out when the storage device 18 is initially detected as being attached to the DRAM interface 16. Additional procedural details may be obtained from the United States Patent Application Publication No. US 2014/0237176, published on Aug. 21, 2014 to Takefman et al.

In particular embodiments, the device controller 48 may be pre-configured in hardware/firmware to expect the protocol training data—control and status data—in a specific sequence/order from the host memory controller 24. The device controller 48 also may be pre-configured to expect the host 14 to repeat transmission of each protocol training data a pre-determined number of times (discussed later). Such pre-configuration may be a state machine-based implementation, which prepares the device controller 48 for what to expect from the host 14 and in which sequence/order. Because the device controller 48 also may be made aware of the type of the I/O command/status information and the order in which the I/O command/status information (such as DRAM command/status information) will be sent to it by the host 14 during the protocol training phase, such pre-configuration allows the controller 48 to internally "interpret" each received encoded command and status data during the training phase. For example, if the hardware pre-configuration indicates that a memory read command will be the first command to be received from the host 14 at the initiation of the training phase, the device controller 48 may be configured in hardware/firmware to "interpret" this command by assigning appropriate internal memory fetch operations to the encoded version of the memory read command being stored in an addressable storage, like the CAM 38, during the training phase. After the training, when an encoded command is received from the host 14 at run time and "decoded" as a memory read command, the device controller 48 may simply perform the command-specific memory fetch operations that were internally-assigned earlier during the protocol training phase. The memory fetch operations may include, for example, address translation, access to a specific memory unit in the internal non-volatile memory portion 34, retrieval of the stored content from the accessed memory unit, and the like. In this manner, the received command may be executed without the need to perform any reverse engineering of the encoding algorithm. Each encoded command and status data received from the host 14 during the protocol training phase may be similarly processed. As a result, at the conclusion of the protocol training, the storage device 18 is ready to communicate with the host 14 over the DRAM interface 16, regardless of the host-specific encoding of the communication carried out over the DRAM interface 16.

In the event that the storage device 18 is a block-based non-volatile memory such as an SSD, there may not be a need to send certain DRAM channel command or status information to such a block-based storage device during the training phase, especially when such information is uniquely applicable only to a conventional DRAM-based DIMM. In that case, in one embodiment, a subset of the JEDEC-defined DRAM channel-specific control/status information may be sent to the storage device 18 during the training phase, and exchanged later during run-time.

FIG. 5 shows an exemplary register-based storage configuration for control and status data during the protocol training phase according to one embodiment of the present disclosure. In FIG. 5, various registers in the RBU 40 of FIG. 2 are shown to include a control register 42, a status register 44, and a plurality of other registers 46. As mentioned earlier, in particular embodiments, the "handshake" between the device driver 28 and the storage device 18 may make the device ready for the protocol training mode. For example, in case of an I/O storage device such as a DIMM-based SSD, the "handshake" may allow the driver 28 to place the SSD in the "global configuration" mode during the training phase. In one embodiment, each register in the RBU 40 may store 64 bytes of DRAM burst (non-ECC) and may have an offset address associated with it as shown in FIG. 5. For example, the buffer manager 50 in the device controller 48 may internally associate the hexadecimal offset address "0x0" with the control register 42, the offset address "0x40" with the status register 44, and so on. However, when ECC is present in the system 10, each register may be configured to receive and store a maximum of 72 bytes to accommodate host ECC data-64 bytes of "raw" data accompanied by corresponding 8 bytes of ECC (1 bit of ECC per 8-bit of raw data). For example, in case of the control register 42 in the 64-byte register storage configuration of FIG. 5, the buffer manager 50 may be configured to store the 64 bytes of the raw control data in the control register 42, whereas the 8 bytes of ECC data may be stored in any of the other registers 46—such as the registers with offset addresses 0x80, 0xC0, 0x100, and so on—in the RBU 40. In that case, the term "control register" may collectively refer to the control register 42 as well as the register storing the ECC portion. During training, the 72 bytes of status data may be stored similarly as well. Thus, in particular embodiments, the ECC data may not have to be mapped.

In particular embodiments, the register-specific offset addresses may be conveyed (by the device controller 48) to the device driver 28 during the driver-device handshake. Furthermore, the storage device 18 itself may have a base address associated with it, for example, in the memory map created in the host's BIOS. In one embodiment, the memory controller 24 may be operatively configured by the device driver 28 to use the offset address in conjunction with the base address to access a specific register in the RBU 40. Thus, the first step in protocol training may be to set up/establish at least one control register 42 and associate a memory address (=storage device's base address+0x0) with it, and also to set up at least one status register 44 and associate a corresponding memory address (=storage device's base address+0x40) with it so that communication can occur between the host 14 and the DIMM-based storage device 18 during the remaining protocol training. Thereafter, during the protocol training phase, the device driver 28 may instruct the host memory controller 24 (for example, through the CPU's execution of the OS 26 running the device driver 28) to write a plurality of control/status bit patterns (as discussed below) to the memory addresses associated with the control/status registers.

It is noted here that because the storage device 18 is not a conventional DRAM module—like the DRAM module 20 in FIG. 1, the memory commands and other control signals traditionally sent over the address/command bus of the DRAM interface 16 may not be recognized by the storage device 18. Hence, in particular embodiments of the present disclosure, the data bus portion of the DRAM interface 16 may be used by the memory controller 24 to convey these signals in binary form to the storage device 18—during protocol training and thereafter during run-time. However, in the conventional DRAM channel communication, data is normally sent as a DRAM burst—such as, for example, a 64-byte (or a 72-byte, in case of ECC) DRAM burst—on the data bus. Therefore, each data (control or status) write operation during the protocol training also may be sent as a 64 byte DRAM burst by the memory controller 24. However, typically, only the first byte of the 64-byte burst may contain the actual command or status information; the other bytes may contain, for example, irrelevant data or dummy data bits padded by the memory controller 24 (for example, as required under the encoding scheme) to generate the 64-byte burst for the control/status write operation. Thus, depending on the level of scrambling, bit/byte swizzling/ steering, data interleaving, ECC, or any other type of encoding, as little as one byte may be the useful portion in the control/status register, out of the 64 bytes received from the host 14. This is symbolically illustrated using the same reference numeral "88" to collectively refer to one byte of storage space in each register shown in FIG. 5. In particular embodiments, however, more than one byte in the data burst may be used to convey the "raw" command/status data.

It is noted here that each DRAM burst containing control or status data may be referred to herein as a "data pattern." In the context of the control data, each data pattern may be referred to as a "control bit pattern", which may include an encoded version of a respective DRAM command. As discussed below, the device controller 48 in the storage device 18 may select a "command data-containing portion" of the received control bit pattern to be stored in an addressable storage, like the CAM 38, for subsequent look-up at run time. Thus, although the terms "control data" and "command data" are generally used interchangeably herein, they have been occasionally distinguished merely to illustrate that the DRAM command data—whether encoded or not— actually may constitute a small portion of the entire control data pattern received from the host. Similarly, in the context of the status data training, each data pattern from the host 14 may include an encoded version of a respective status data. The device controller 48 may then select and store the appropriate "status data-containing portion" in a register in the RBU 40 for subsequent look-up at run time.

Referring now to the control protocol training phase, it is noted that relevant JEDEC-defined (or standardized) DRAM commands may be conveyed using a unique 8-bit data pattern per command. Hence, the first step during the training phrase is for device driver 28 to operatively configure the memory controller 24 (or the CPU 22) to sequentially write a single byte of command data—with values ranging from 0 through 255—to the control register 42 having the offset address 0x0. As noted above, this single byte may be sent using a 64-byte (non-ECC) or 72-byte (ECC) DRAM burst. In the embodiment of FIG. 5, the same control register 42 may be used/addressed to store each sequentially-received control bit pattern. In particular embodiments, each byte value may be repeatedly written a pre-determined number of times. In one embodiment, the pre-determined number may be user-programmable through the device driver 28. For example, in one embodiment, each byte of command data may be sequentially written four (4) times in the following order: 0, 0, 0, 0, 1, 1, 1, 1, 2, 2, 2, 2, . . . , 254, 254, 254, 254, 255, 255, 255, 255. In one embodiment, in addition to the control register 42, other registers 46 in the RBU 40 may be used internally by the buffer manager 50 to store the repeated transmissions of the same control bit pattern, even when all control bit patterns are addressed to the same control register 42. As noted earlier, in case of encoding being employed by the host 14, each "raw" command byte may be appended with ECC and/or scrambled (perhaps also bit/byte swizzled/steered), and then repeatedly sent to the storage device 18 by the memory controller 24 as a control bit pattern, which may be a 64-byte (without ECC) or 72-byte (with ECC) DRAM burst. Each (command) byte value—in the form of a corresponding control bit pattern—may be sent four times, for example, to protect from a rare bit error. Thus, repeated transmissions of the same control bit pattern may provide a check on the data integrity. If the four control bit patterns are not the same, then the device controller 48 may look for three matching patterns out of four for each bit position. On the other hand, if a bit position has two 1's and two 0's, then the device controller 48 may report an error state to the device driver 28. The error state may indicate that the I/O channel, like the DRAM channel 16, is probably not useable or may signify that the I/O channel would need to be retrained.

In the presence of encoding, each control bit pattern includes an encoded version of the corresponding command data byte. However, because of encoding (such as, for example, scrambling, bit/byte swizzling/steering, data interleaving, and the like), the command data-containing portion in the received control bit pattern may be more than a byte in length. For example, scrambling granularity employed by the memory controller 24 may be implementation-specific, and may result in distribution of the command data bits over a smaller or larger section of the 64-byte (or 72-byte) control bit pattern. Therefore, upon receiving a control bit pattern, the logic in the device controller 48 may need to determine the command data-containing portion in the control bit pattern. In some embodiments, based on its knowledge of which command data to expect and in which order, the device controller 48 may assess the statistical distribution of bit positions of the encoded version of a command data in a respective control bit pattern (in the sequence of control bit patterns being sent by the memory controller 24), and may also optionally estimate the level of randomness of the distribution—such as, for example, when scrambling is present. Based on the assessment and estimation (if any), the device controller 48 may identify the command data bits within the assessed bit positions. The data portion containing these identified command bits may be considered as the command data-containing portion of the respective control bit pattern. In particular embodiments, only the command data-containing portion (including the identified data bits) may be stored in the CAM 38, as discussed below with reference to FIG. 6. Thus, the number of bits to be stored in the CAM 38 may depend on the level of scrambling employed by the host memory controller 24.

The command data-containing portion may be considered as the "trained value" to be stored in the storage device 18 (more specifically, in the CAM 38 in the embodiments of FIGS. 2 and 7) during the control protocol training phase. In particular embodiments, the trained value for each DRAM burst (of control bit pattern) may comprise one of the following number of bits, depending on the level of scrambling and other encoding (as noted before): 64 bits (no ECC), or 72 bits (ECC present), or 128 bits (no ECC), or 144 bits (ECC present), or 256 bits (no ECC), or 288 bits (ECC present), and so on. The trained value associated with each control bit pattern received from the host 14 may be stored in the CAM 38.

The same steps may be repeated for the status protocol training and, hence, only a brief discussion of the status protocol training is provided here. The "training" data patterns containing status data may be written to the status register 44 having offset address 0x40. Each data pattern may be repeated a pre-determined number of times—like four times, as in case of control bit patterns. As noted earlier, the pre-determined number for repeated transmissions of the same data pattern may be user-programmable, for example, through the device driver 28. In case of the status protocol training, the captured values (or status-data containing portions) may probably differ from the captured values associated with the control protocol training, even though the training sequence is the same in both cases: 0, 0, 0, 0, 1, 1, 1, 1, 2, 2, 2, 2,. . . , 254, 254, 254, 254, 255, 255, 255, 255. The values may differ because data scrambling may have an address dependency, and the control and status registers have different memory addresses associated with them. Furthermore, ECC, if present, may provide additional differences in the status data patterns sent to the storage device 18. Therefore, it may be desirable to perform the data capture step separately for each register 42 and 44. In other words, the control protocol training should be done separately from the status protocol training. It is observed here that, in one embodiment, the "status register" may include the register 44 and other registers—internally accessed by the buffer manager 50—in the RBU 40. In particular embodiments, all of the status data-containing portions may be stored in the single status register 44, which may be configured to store 256 entries, each entry having 64 bits (non-ECC)/72 bits (ECC) or more. Alternatively, in other embodiments, the status register 44 may simply receive the DRAM burst-based status data pattern (64 or 72 bytes); the status data-containing portions may be stored in one or more of the other registers 46 in the RBU 40. The buffer manager 50 may internally manage access to various registers in the RBU 40 and retrieval of the register-stored content, as needed.

If any of the aforementioned control/status training fails, it may be desirable to wait a relatively long time (such as, for example, 10 ms) and then re-initiate the training. In particular embodiments, the storage device 18 may be configured to "timeout" if no values are received for 2 ms during the training phase, and the device can then assume that the training will restart.

Once the protocol training for the control and status registers is over, there is now a mechanism for the host 14 and the storage device 18 to communicate over a standardized I/O channel, irrespective of the host-specific encoding scheme. For example, at run-time, the host 14 (executing the device driver 28) can write a command byte (using a DRAM burst of control data pattern) to the offset address 0x0 (representing the control register 42) on the storage device 18. In one embodiment, the device controller 48 may first determine the command data-containing portion in the received control data pattern and then perform a CAM lookup of all 256 of the 72-bit encoded values (or any other bit size used for the stored command data-containing portions, as discussed earlier) to "decode" the received command data-containing portion to determine the respective command byte associated with the decoded portion. As mentioned before, the firmware in the device controller 48 may identify the command byte and associated memory operations needed to execute the command. The CAM lookup is described below with reference to FIG. 6. Similarly, the storage device 18 can write/generate an appropriate status data-containing portion that the host 14 can read. For example, upon conclusion of command execution (or at any time during run-time when the status information needs to be reported to the host 14), the firmware in the device controller 48 may determine—based on the result of the memory operations for command execution—the appropriate status byte to report the result of the command execution. Thereafter, the device controller 48 may perform an index lookup of the status register(s) 44 or any other register(s)—where status data-containing portions have been stored during the status protocol training phase—to identify/generate the correct 72-bit encoded value (or any other bit size used for the stored status data-containing portions, as discussed earlier) to report back to the host 14. At run time, the identified status data-containing portion may be written into the status register 44 or any other register (functioning as a "status register") in the RBU 40. Because the identified value is stored in the same encoding format as initially received from the memory controller 24 during the status training phase, the memory controller 24 can correctly decode it (de-scramble, ECC check, and the like) and report the status information to the CPU 22. The memory controller 24 may be configured by the device driver 28 to read the appropriate register to retrieve the status value being reported by the storage device 18. In contrast to the comparison of two data values needed to decode a received control data pattern, the status data generation does not require such comparison and, hence, in particular embodiments, there may not be any need to employ a CAM-based storage for status data-containing portions.

It is noted here that typically one byte of a DRAM burst may contain the control or status data. Hence, a total of 256 data patterns may be used during the control/status protocol training. The relevant byte may be the first byte in the DRAM burst. However, that may not be the case always. For example, in some embodiments, more than one byte in the DRAM burst may be needed to convey the control/status data. Hence, the 256 data pattern-based discussion above is merely an example. In particular embodiments, the total number of data patterns used for the control and status protocol trainings may be more or less than 256. Furthermore, the total number of data patterns for the control protocol training may be different from those for the status protocol training. Additionally, in particular embodiments, there may be multiple control registers 42 and multiple status registers 44, which may increase the training bandwidth. For example, in the multiple register configuration, each register may be associated with a specific set or type of control/status information to increase the bandwidth of the training data. Each register may be assigned its own memory address as well and may be independently addressed by the memory controller 24.

FIG. 6 illustrates a simplified architecture of the CAM 38 in the storage device 18 of FIG. 2 according to one embodiment of the present disclosure. Unlike a standard computer memory (such as a RAM or a DRAM) in which the user supplies a memory address and the memory returns the data word stored at that address, the CAM 38 is designed such that the user supplies a data word and the CAM searches its entire memory to see if that data word is stored anywhere in it. If the data word is found, the CAM 38 may return a list of one or more storage addresses in the CAM 38 where the word was found. In some embodiments, the CAM 38 may also return the data word or other associated pieces of data. Based on the storage address returned by the CAM 38, the device controller 48 may access that address within the CAM 38 and retrieve the corresponding data. Thus, in the embodiment of FIG. 6, the CAM 38 may receive the content to be searched—here, a command data-containing portion—as an input 90. As noted before, the input 90 to the CAM 38 may be the command data-containing portion "extracted" from a control data pattern received from the host 14 at run time. The received input may be stored in a search register 92 in the CAM 38. The logic circuits (not shown) in the CAM 38 may then perform a search operation 93 on a CAM-stored content 94—where all command data-containing portions representing the "trained data" generated during the control protocol training phase are stored. In the context of the earlier-discussed control protocol training example, the CAM-stored content 94 may include 256 entries, each entry having 64 bits (no ECC) or 72 bits (with ECC), or more. If the content in the search register 92 matches with any entry present in the CAM-stored content 94, the CAM 38 may generate an output 96, which may provide the address of the matching location in the CAM-stored content portion 94 and/or the matching content itself. As mentioned earlier, the matching content will be the command data-containing portion stored during the control protocol training phase and matching the CAM input 90. As also discussed earlier, the CAM output 96 may be used by the device controller 48 to "decode" the received command data-containing portion (at CAM input 90) to determine the respective command byte associated with the decoded portion, and to subsequently execute the command. It is noted here that the CAM lookup may not have to occur in a single clock cycle. Furthermore, hardware support with appropriate data structure—such as, for example, pre-organization of the CAM content into a tree structure after the control protocol training, but before lookups begin—may reduce performance impact from retrieval of matching content.

FIG. 7 is an example flowchart 100 illustrating how user data may be stored in the storage device 18 of FIGS. 1-2 according to one embodiment of the present disclosure. As discussed with reference to the embodiments in FIGS. 7-8, the storage and retrieval of user data may differ from that of the control/status data discussed earlier with reference to FIGS. 3-6. The flowchart 100 in FIG. 7 relates to storage of user data when encoding is employed by the host 14. In particular embodiments, various operational aspects illustrated in the flowchart 100 may be performed by the storage device 18—for example, by the device controller 48 in the storage device under operative control of the device driver 28, 30. However, for simplicity and ease of discussion, the specific identification of entity/entities performing a particular method step may be occasionally omitted. Referring again to FIG. 7, at block 101, the storage device 18 may be initially configured to be attachable to and operable through an I/O interface, like the DRAM interface 16, which is supported by a host, such as the host 14. The storage device 18 also may be configured to store user data received from the host 14 in a plurality buffers within the storage device 18. An exemplary buffer configuration is shown in FIG. 8, which is discussed later. In certain embodiments, the buffer configuration may have a plurality of equal-sized buffers. As before, in particular embodiments, the storage device 18 may be a DIMM-based SSD, as noted at block 102 in FIG. 7. At block 104, the storage device 18 may receive—for example, as part of a memory write operation—the following from the host 14 via the I/O interface, such as the DRAM interface 16: (i) a memory-mapped buffer address of one of the plurality of buffers in the storage device, and (ii) an encoded version of a memory page of user data. As mentioned before, scrambling, ECC, bit/byte swizzling/steering, and/or any other type of data encoding/protection may be present in the encoded version of the user data received from the host 14. In particular embodiments, each memory page of data may be 4 kilobytes (KB) in size. At block 106, the storage device 18 may store the encoded version of the received user data into the buffer having the memory-mapped buffer address (received from the host 14 at block 104). Thus, the user data is stored in the as-received condition—including any encoding by the host 14 and without modifying the host-specific encoding format. Thereafter, at block 108, the storage device 18 may receive an instruction from the host 14 to read the content stored at the same memory-mapped buffer address as that received earlier at block 104. In response, the storage device 18 may access the appropriate buffer—here, the buffer selected at block 106—and provide the stored encoded version of the earlier-received user data (at blocks 104, 106) to the host 14 via the I/O interface, such as the DRAM interface 16, as noted at block 110. Because the retrieved data was stored (at block 106) without any modification to its encoding format, the host memory controller 24 would "recognize" the encoded data sent to it at block 110 and be able to decode it as needed. Thus, by preserving the host-specific encoding in the user data stored in the storage device 18, an effective DRAM channel-based user data communication (storage and retrieval) mechanism may be established between the storage device 18 and the host 14, irrespective of the particular encoding scheme(s) employed by the host 14 and without any need to perform reverse engineering at the storage device 18.

FIG. 8 illustrates how non-volatile memory—such as, for example, the NVM storage portion 34 in FIG. 2—in the storage device 18 of FIGS. 1-2 may be "organized" using appropriate address mapping and set-associativity to store user data according to particular embodiments of the present disclosure. For the sake of discussion and ease of explanation, it is assumed in the context of FIG. 8 that the storage device 18 is a block-based storage device such as, for example, a DIMM-based SSD. The storage configuration discussed with reference to the embodiment of FIG. 8 may apply to other types of storage devices as well, with suitable modifications (if needed). The storage portion 34 in the exemplary embodiment of FIG. 8 is shown "organized" into two "memory banks" 115, 117—Memory Bank 0 and Memory Bank 1, respectively, thereby effectively "converting" the SSD's block-based storage configuration into a memory bank-based storage arrangement (similar in nature to the memory banks in a conventional DRAM module), but without physically modifying the configuration/architecture/layout of the non-volatile/flash memory units in the storage portion 34. In other words, the storage device 18 and the storage portion 34 remain block-based; the memory "bank" based arrangement in FIG. 8 is merely an internal mechanism/artifice (operatively managed by the NVM controller 52 or the device controller 48) to "align" the non-volatile storage 34 in the storage device 18 with a typical DRAM module-based storage configuration to provide flexibility in the storage of user data as discussed below. These memory banks 115, 117 may serve as memory-mapped locations in the storage device 18 when the memory controller 24 wishes to read/write user data over the DRAM interface 16. Because the storage device 18 in the embodiment of FIG. 8 is a block-based SSD, each memory-mapped location (or memory bank) may have a pair of I/O buffers associated with it. Each I/O buffer may be configured to function as a write buffer and a read buffer. Such buffer-based configuration may enable the host 14 to read or write data at the same location/buffer address in order for scrambling, ECC, and/or any other host-based encoding scheme to work correctly, especially when the encoding scheme—such as scrambling—has address dependency. As shown in FIG. 8, each memory bank 115, 117 may be "formed" of two different, equal-sized physical "buffers"—Buffer 0 and Buffer 1. As a result, a total of two memory banks 115, 117, and four buffers 119-120, 122-123 are shown in FIG. 8. Each buffer 119-120, 122-123 may function as a read buffer (for sending data to the host during a memory read operation) and a write buffer (for receiving data from the host during a memory write operation).

It is noted here that the memory banks 115, 117 shown in FIG. 8 may be essentially logical partitions that may be internally managed by the device controller 48—or, the NVM controller 52 in FIG. 2—to enable the host's memory controller 24 to separately address each memory bank 115, 117 as if the memory bank 115, 117 were a DRAM memory bank connected to the DRAM interface 16, like the memory banks (not shown) in the DRAM module 20 in FIG. 1. Thus, the logical partitioning in FIG. 8 allows the memory controller 24 to treat the NVM storage portion 34 similar to the memory bank-based storage configurations in a typical DIMM-based DRAM module, like the module 20.

Furthermore, the "buffers" 119-120 and 122-123 created through the above-mentioned arrangement may be different from the buffers 46 in the RBU 40 in FIG. 2. For example, each "buffer" 119-120, 122-123 in the embodiment of FIG. 8 may be physically formed of a respective portion of the plurality of flash memory units in the non-volatile storage 34. Additionally, the memory units in each buffer 119-120, 122-123 may be effectively partitioned into a plurality of equal-sized "blocks" or "sectors" 125-140 to provide the requisite block-based storage for the SSD 18. As shown in FIG. 8, the blocks 125-128 relate to the buffer 119, the blocks 129-132 relate to the buffer 120, blocks 133-136 relate to the buffer 122, and blocks 137-140 relate to the buffer 123. In the embodiment of FIG. 8, each block is assumed to be equal to the size of a DRAM memory page of user data received from the host memory controller 24. In one embodiment, each memory page may be of 4 kilobytes (KB) size. The memory page size may be fixed and pre-defined in the system 10, but may be different in different systems. Hence, each I/O buffer 119-120, 122-123 may be of 16 KB size (for user data), and operable to store ECC bits (if any). Consequently, all four I/O buffers 119-120, 122-123 may be memory-mapped (by the host OS 26 and the memory controller 24) across a total of 64 KB of address space (16 KB/buffer×4 buffers). In one embodiment, the memory-mapped buffer address (at block 104 in FIG. 7) from the host's memory controller 24 may not only identify the memory bank associated with a given I/O buffer, but may also identify the buffer itself within the identified memory bank. For example, if there is a memory write operation being performed by the host 14 to the buffer 119 in the memory bank 115, a memory-mapped buffer address from the host 14 may include not only the address identifying the memory bank 115 associated with the buffer 119, but also the offset address 0x0 for the buffer 119. This memory-mapped buffer address transmitted on the DRAM channel 16 by the host memory controller 24 may also include the system base address for the DIMM-based SSD 18 to identify the SSD 18 on the DRAM channel.

In the embodiment of FIG. 8, each block in a buffer may be accessible using a corresponding Logical Block Address (LBA), and a plurality of LBAs may be assigned to each respective physical block using set associativity. Each LBA may be associated with the 4 KB of memory page of data in the block/sector. For example, as shown in FIG. 8, LBA 0 through LBA 3 may be assigned to blocks 0 through 3 (identified using reference numerals 125-128, respectively) in the buffer 119 (offset address 0x0) in the memory "bank" 115, LBA 4 through LBA 7 may be assigned to blocks 4 through 7 (identified using reference numerals 129-132, respectively) in the buffer 120 (offset address 0x4000) in the memory "bank" 115, LBA 8 through LBA 11 may be assigned to blocks 8 through 11 (identified using reference numerals 133-136, respectively) in the buffer 122 (offset address 0x8000) in the memory "bank" 117, and LBA 12 through LBA 15 may be assigned to blocks 12 through 15 (identified using reference numerals 137-140, respectively) in the buffer 123 (offset address 0xC000) in the memory "bank" 117. The set-associativity may allow multiple different LBAs to refer to the same physical block in a buffer. For example, in case of the total of sixteen blocks divided among the two memory banks 115, 117 in the embodiment of FIG. 8, an LBA may be assigned to a specific block using a modulo 16 operation for set-associativity. Thus, LBA 16 may be associated with block 0 (16 modulo 16=0) in the buffer 119, LBA 17 may be associated with the block 1 (17 modulo 16=1) in the buffer 119, and so on, as shown in FIG. 8. In other words, using set-associativity, LBAs 0, 16, 32, 48, and so on, may be assigned to the same block 0 in the buffer 119; LBAs 1, 17, 33, 49, and so on, may be assigned to the same block 1 in the buffer 119, and so on, as shown in FIG. 8. In particular embodiments, set-associativity may be needed only when an encoding scheme—such as, for example, scrambling—used by the host 14 has address dependency. If the host scrambling scheme does not have address dependency, set-associativity may not be needed. In that case, multiple LBA values associated with a block/sector may not comply with the modulo 16 operation.

It is observed that, in the embodiment of FIG. 8, user data may be written and read from the same location/buffer concurrently by using different LBAs for reading and writing operations. However, in view of set-associativity in particular embodiments, each specific LBA still may need to be written to or read from the same buffer address assigned to the LBA. As discussed earlier, the user data from the host 14 may be stored on the SSD 18 just as it is received from the host memory controller 24—that is, in the scrambled form and including ECC (if present). Even if the scrambling has address dependency, the data storage methodology discussed earlier with reference to the embodiment of FIG. 8 would work because the data is always read back from the same physical memory buffer location. Because the user data received from the host 14 is stored without any modification, this ensures that the memory controller 24 will be able to de-scramble the retrieved data correctly and check the ECC for the read-back data.

It is observed here that extra ECC bits in the user data received from the host 14 may affect the "alignment" of data blocks in the block-based storage configuration of FIG. 8. Furthermore, the ECC bits may affect random write/read performance of the DIMM-based SSD 18. However, in particular embodiments, the device/SSD controller 48 (or the NVM controller 52) may be configured—such as, for example, in firmware or through the device driver 28, 30 at run time—to manage storage of such ECC-containing data across different blocks in a buffer to facilitate random read/write performance.

The memory configuration illustrated in the exemplary embodiment of FIG. 8 may be expanded to cover 8 banks (similar to DDR3 DRAMs), or 16 banks (similar to DDR4 DRAMs), or any other existing or future DRAM memory bank configuration (or storage capacity) to facilitate storage/retrieval of user data via a memory bank-based addressing on the DRAM channel 16 by the memory controller 24, despite the storage device 18 not being a conventional DRAM module.

Figure 9:
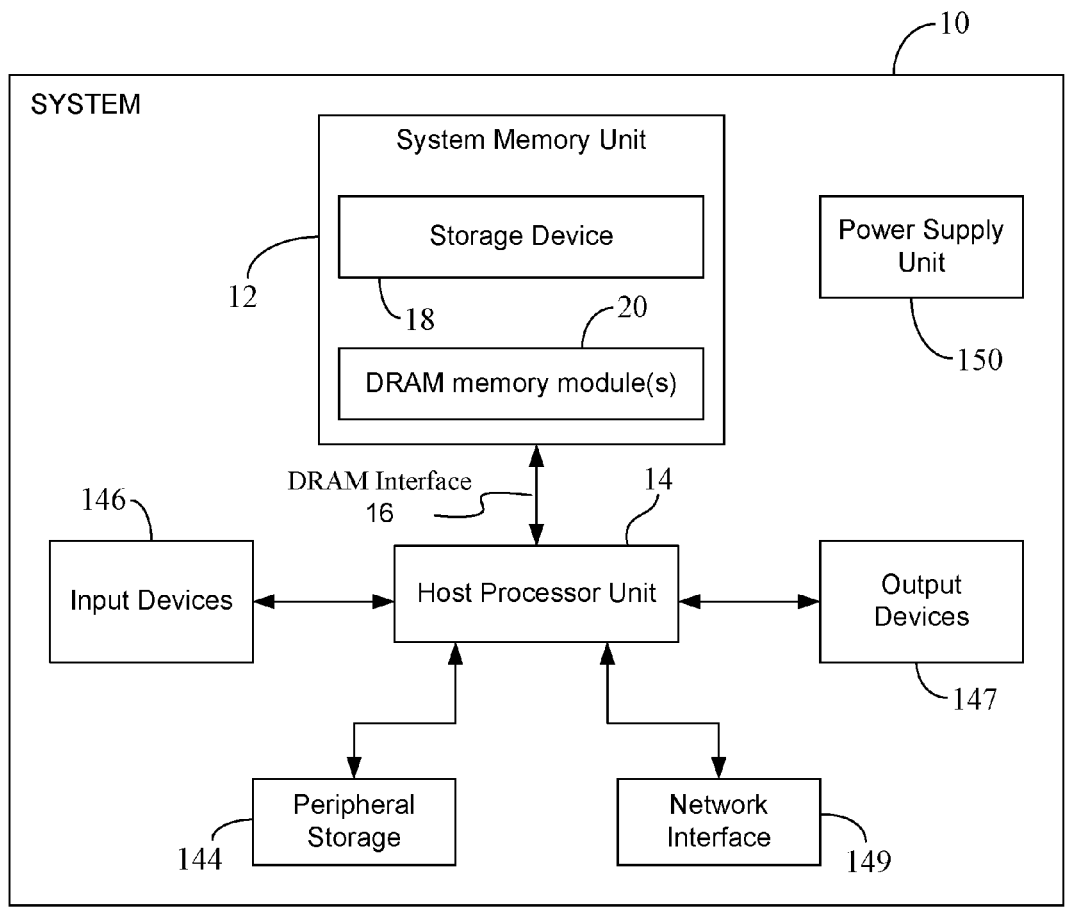
FIG. 9 depicts an overall layout of the system in FIG. 1 according to one embodiment of the present disclosure.

FIG. 9 depicts an overall layout of the system 10 (incorporating the storage device 18) in FIG. 1 according to one embodiment of the present disclosure. Hence, for ease of reference and discussion, the same reference numerals are used in FIGS. 1 and 9 for the common system components/units.

In FIG. 9, the host processor unit 14 is shown coupled to the system memory unit 12 (via the DRAM interface 16) as well as to a peripheral storage unit 144, one or more input devices 146, one or more output devices 147, and a network interface unit 149. In some embodiments, the system 10 may include more than one instance of the devices or units shown. Some examples of the system 10 include a computer system (desktop or laptop), a tablet computer, a mobile device, a video gaming unit or console, a machine-to-machine (M2M) communication unit, a stateless "thin" client system, or any other type of computing or data processing device having a DRAM interface, like the DRAM interface 16. In various embodiments, the system 10 may be configured as a rack-mountable server system, a standalone system, or in any other suitable form factor. In some embodiments, the system 10 may be configured as a client system rather than a server system.

In particular embodiments, the host processor unit 14 may include more than one CPUs, and/or the system 10 may include more than one processor units 14 (e.g., in a distributed processing configuration). Additional details of the host 14 are already provided earlier with reference to discussion of FIGS. 1-2 and, hence, those details are not repeated here for the sake of brevity. When the system 10 is a multiprocessor system, there may be more than one instance of a CPU or processor. As mentioned earlier, the host 14 may be a System on Chip (SoC).

The memory unit 12 may include at least one DIMM-based storage device, like the storage device 18 in FIGS. 1-2. The storage device 18 may be configured—in hardware and/or software—to perform storage and retrieval of control/status/user data as per the embodiments in FIGS. 3-8. In particular embodiments, the memory unit 12 may also include one or more DRAM modules, like the DRAM module(s) 20 in FIG. 1. Various examples of the memory units that may comprise the storage device 18 are also given before with reference to discussion of FIGS. 1-2. The DRAM memory module(s) 20 may include a conventional DDR2/DDR3/DDR4 DRAM module, or a DRAM-based 3DS memory module such as, for example, an HBM module, or an HMC memory module. Also, in some embodiments, the system memory 12 may include multiple different types of semiconductor memories, as opposed to a single type of memory.

The peripheral storage unit 144, in various embodiments, may include support for magnetic, optical, magneto-optical, or solid-state storage media such as hard drives, optical disks (such as CDs or DVDs), non-volatile RAM devices, etc. In some embodiments, the peripheral storage unit 144 may include more complex storage devices/systems such as disk arrays (which may be in a suitable RAID (Redundant Array of Independent Disks) configuration) or Storage Area Networks (SANs), which may be coupled to the processor 14 via a standard Small Computer System Interface (SCSI), a Fibre Channel interface, a Firewire® (IEEE 1394) interface, or another suitable interface. In one embodiment, the peripheral storage unit 144 may be coupled to the processor 14 via a standard peripheral interface such as, for example, the Peripheral Component Interface Express (PCI Express™) standard based interface, the Universal Serial Bus (USB) protocol based interface, or the IEEE 1394 (Firewire®) protocol based interface.

In particular embodiments, the input devices 146 may include standard input devices such as a computer keyboard, mouse or other pointing device, a touchpad, a joystick, or any other type of data input device. The output devices 147 may include a graphics/display device, a computer screen, an audio speaker, an alarm system, a CAD/CAM (Computer Aided Design/Computer Aided Machining) system, a video game station, or any other type of data output or process control device. In some embodiments, the input device(s) 146 and the output device(s) 147 may be coupled to the host processor unit 14 via an I/O or peripheral interface(s).

In one embodiment, the network interface 149 may communicate with the host processor unit 14 to enable the system 10 to couple to a network (not shown). In another embodiment, the network interface 149 may be absent altogether. The network interface 149 may include any suitable devices, media and/or protocol content for connecting the system 10 to a network—whether wired or wireless. In various embodiments, the network may include Local Area Networks (LANs), Wide Area Networks (WANs), the Internet, wired or wireless Ethernet, telecommunication networks, or other suitable types of networks.

The system 10 may include an on-board power supply unit 150 to provide electrical power to various system components illustrated in FIG. 9. The power supply unit 150 may receive batteries or may be connectable to an AC electrical power outlet. In one embodiment, the power supply unit 150 may convert solar energy into electrical power.

In the preceding description, for purposes of explanation and not limitation, specific details are set forth (such as particular architectures, interfaces, techniques, etc.) in order to provide a thorough understanding of the disclosed technology. However, it will be apparent to those skilled in the art that the disclosed technology may be practiced in other embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Thus, for example, it will be appreciated by those skilled in the art that block diagrams herein, such as, for example, in FIGS. 1-2, 5-6, and 8-9, can represent conceptual views of illustrative circuitry or other functional units embodying the principles of the technology. Similarly, it will be appreciated that the flow charts herein, such as, for example, in FIGS. 3-4 and 7 may represent various processes or innovative aspects which may be substantially performed, for example, by the storage device 18 in conjunction with the device driver 28, 30 and in an operative environment involving communication with the host unit 14. The host 14 may be suitably configured as well—in hardware and/or software—to support various protocol training and data storage methodologies discussed herein. In particular embodiments, the host 14 may include, for example, a general purpose processor, a special purpose processor, a conventional processor, a digital signal processor (DSP), a plurality of microprocessors, one or more microprocessors in association with a DSP core, a microcontroller, Application Specific Integrated Circuits (ASICs), Field Programmable Gate Arrays (FPGAs) circuits, any other type of integrated circuit (IC), and/or a state machine.

When certain inventive aspects require software-based processing, such software or program code may reside in a computer-readable data storage medium (not shown). Such data storage medium may be part of the peripheral storage 144, or may be part of the internal memories of the host 14 and the storage device 18 (as described before). The host 14 and/or the device controller 48 (in the storage device 18) may execute relevant instructions stored on such a medium to carry out the software-based processing. Such relevant instructions may include, for example, different API-provided functions discussed earlier, as well as any ancillary program code that may be needed to effectuate the protocol trainings and subsequent DRAM channel-based control/status/user data communications discussed herein. The computer-readable data storage medium may be a non-transitory data storage medium containing a computer program, software, firmware, or microcode for execution by a general purpose computer or a processor mentioned above. Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

Alternative embodiments of the communication model according to inventive aspects of the present disclosure may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features. As mentioned before, the functions of some of the elements in the system 10—such as, for example, the storage device 18 and the host unit 14—may be provided through the use of hardware (such as logic circuits) and/or hardware capable of executing software/firmware in the form of coded instructions or microcode stored on a computer-readable data storage medium (mentioned above). Thus, such functions and illustrated functional blocks are to be understood as being either hardware-implemented and/or computer-implemented, and thus machine-implemented.

The foregoing describes a training protocol that enables communication between a host system and a DRAM memory channel DIMM form-factor storage device, such as a DDR form-factor based SSD, without the need to know or reverse engineer the encoding methods or algorithms applied by the host platform memory controller. The protocol may work with a variety of scrambling, ECC, and other data protection schemes, and may be generally applied to any application where a non-standardized usage I/O storage device (such as a DIMM-based storage device) is attached on a standardized I/O channel or I/O interface (such as a DRAM channel) and needs to exchange information with a host. Using the protocol, the host can send control information to and receive status information from the DIMM-based I/O storage device in the host-recognizable manner, regardless of the encoding or data protection schemes used on the DDR I/O channel. During the protocol training phase, the control/status data may be written to the DIMM-based storage device by sending a protocol training sequence of known values and storing the associated command/status data in the storage device in the same encoding format as that received from the host. These stored values then may be used at run time to execute encoded commands received from the host and also to report status data to the host in the encoding format recognizable by the host. A memory bank-based buffered configuration is described for storage of user data, which are also stored in the as-received condition to preserve the host-specific encoding and, hence, to facilitate exchange of data between the host memory controller and the DIMM-based storage device over the DRAM channel.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method comprising:
    detecting that a storage device is attached to Input/Output (I/O) interface supported by a host;
    in response to said detecting, instructing the host to write a first sequence of data patterns to the storage device using the I/O interface, wherein a data pattern in the first sequence includes an encoded version of respective command data bits of an I/O command, and wherein the data pattern in the first sequence is written a pre-determined number of times before a next data pattern in the first sequence is written to the storage device, wherein the pre-determined number is greater than one;
    storing a command data-containing portion of the written data pattern in an addressable storage in the storage device;
    receiving, at the storage device, a control bit pattern from the host over the I/O interface, wherein the control bit pattern includes an encoded I/O command; and
    using one or more command data-containing portions in the addressable storage to decode the encoded I/O command received through the control bit pattern.

2. The method of claim 1, wherein the I/O interface is a Dynamic Random Access Memory (DRAM) interface, the encoded I/O command is an encoded DRAM command, and the storage device is configured to operate via the DRAM interface.

3. The method of claim 1, wherein instructing the host to write the first sequence of data patterns includes:
    establishing a control register within the storage device, wherein the control register is configured to store at least the command data-containing portion of the data pattern in the first sequence;
    associating a memory address with the control register; and
    instructing the host to write the data pattern in the first sequence to the memory address associated with the control register.

4. The method of claim 1, further comprising:
    further instructing the host to write a second sequence of data patterns to the storage device using the I/O interface, wherein a data pattern in the second sequence includes an encoded version of a respective status data, and wherein the data pattern in the second sequence is written the pre-determined number of times before a next data pattern in the second sequence is written to the storage device;
    storing a status data-containing portion of the data pattern in the second sequence in a register in the storage device;
    decoding the received I/O command using the addressable storage;
    accessing the register in the storage device;
    based on a result of an operation, retrieving a corresponding status data-containing portion from the register; and
    providing the retrieved status data-containing portion to the host as a response to the received I/O command.

5. The method of claim 4, wherein the data pattern in the first sequence and the data pattern in the second sequence are written in a pre-defined order known to the storage device.

6. The method of claim 4, wherein instructing the host to write the second sequence of data patterns includes:
    establishing a status register within the storage device, wherein the status register is configured to store at least the status data-containing portion of the data pattern in the second sequence;
    associating a memory address with the status register; and
    instructing the host to write the data pattern in the second sequence to the memory address associated with the status register.

7. The method of claim 4, wherein the data patterns in the first and the second sequences are sent to the storage device by the host in transmission formats defined for the I/O interface.

8. A method comprising:
    configuring a storage device to be attachable to and operable through an Input/Output (I/O) interface supported by a host, wherein the storage device is configured to store data received from the host in a plurality of buffers within the storage device;
    receiving, at the storage device, the following from the host via the I/O interface:
        a memory-mapped buffer address of one of the plurality of buffers, and
        an encoded version of a memory page of data;
    storing the encoded version of the received memory page of data into the buffer having the memory-mapped buffer address;
    receiving an instruction from the host to read a content stored at the memory-mapped buffer address; and
    in response to receiving the instruction, providing the stored encoded version of the received memory page of data to the host via the I/O interface.

9. The method of claim 8, wherein the configuring includes:
upon attachment to the I/O interface, training the storage device to recognize host-encoded memory commands so as to enable the storage device to execute the memory commands received from the host over the I/O interface regardless of a first encoding scheme used by the host to encode the memory commands; and
further training the storage device to provide an encoded version of a status information to the host, wherein the status information is sent over the I/O interface and is associated with execution of a corresponding memory command, and wherein the encoded version of the status information is based on a second encoding scheme used by the host to process the status information.

10. The method of claim 8, wherein the I/O interface is a Dynamic Random Access Memory (DRAM) interface, and wherein configuring the storage device includes:
partitioning each buffer into a plurality of blocks, wherein each block is accessible using a corresponding Logical Block Address (LBA), and wherein a size of each block is equal to a size of the memory page of data received from the host; and
organizing the plurality of buffers into a plurality of memory banks, wherein each memory bank contains an identical number of different buffers and is separately addressable by the host as if the memory bank were a DRAM memory bank connected to the DRAM interface, and
wherein, receiving from the host a memory-mapped buffer address of a given buffer in the plurality of buffers includes:
receiving a memory-mapped buffer address that identifies a memory bank associated with the given buffer as well as the given buffer within the identified memory bank.

11. The method of claim 10, further comprising:
assigning a respective plurality of LBAs to each block in the plurality of blocks using set-associativity.

12. A memory module, comprising:
a first storage portion that includes a plurality of memory units to store content;
an interface unit configured to allow the memory module to be attached to and operable through an Input/Output (I/O) interface supported by a host;
a second storage portion; and
a control unit coupled to the first storage portion, the interface unit, and the second storage portion, wherein, upon attachment of the memory module to the I/O interface, the control unit is operative to:
receive from the host a first sequence of data patterns over the I/O interface, wherein a data pattern in the first sequence includes an encoded version of respective command data bits of an I/O command, and wherein the data pattern in the first sequence is received from the host a pre-determined number of times before a next data pattern in the first sequence is received, wherein the pre-determined number is greater than one;
store a command data-containing portion of the written data pattern in the second storage portion;
receive a control bit pattern from the host over the I/O interface, wherein the control bit pattern includes an encoded I/O command; and
use one or more command data-containing portions in the second storage portion to decode the encoded I/O command received through the control bit pattern.

13. The memory module of claim 12, wherein the memory module is one of the following:
a Solid State Drive (SSD) having a Dual In-line Memory Module (DIMM) form-factor;
a block-based storage device having the DIMM form-factor;
a storage device configured to operate via a Dynamic Random Access Memory (DRAM) interface; and
a storage device configured to operate via the I/O interface.

14. The memory module of claim 12, wherein the control unit is further operative to:
access the second storage portion;
compare a bit pattern of the received I/O command against bits of one or more command data-containing portions in the second storage portion to detect a match;
retrieve a matching command data-containing portion from the second storage portion; and
use the retrieved command data-containing portion as a decoded version of the received I/O command.

15. The memory module of claim 12, further comprising:
a status register coupled to the control unit, and
wherein the control unit is further operative to:
receive from the host a second sequence of data patterns over the I/O interface, wherein a data pattern in the second sequence includes an encoded version of a respective status data, and wherein the data pattern in the second sequence is received from the host the pre-determined number of times before a next data pattern in the second sequence is received;
store a status data-containing portion of the data pattern in the second sequence in the status register;
decode the received I/O command using the second storage portion;
access the status register;
based on a result of an operation, retrieve a corresponding status data-containing portion from the status register; and
provide the retrieved status data-containing portion to the host as a response to the received I/O command.

16. The memory module of claim 15, wherein the storage portion includes:
a plurality of physical buffers, wherein each buffer is formed of a respective portion of the plurality of memory units, and
wherein the control unit is further operative to:
receive the following from the host via the I/O interface:
a memory-mapped buffer address of one of the plurality of buffers, and
an encoded version of a memory page of user data;
store the encoded version of the received user data into the buffer having the memory-mapped buffer address;
receive an instruction from the host to read a content stored at the memory-mapped buffer address; and
in response to receiving the instruction, provide the stored encoded version of the received user data to the host via the I/O interface.

17. The memory module of claim 16, wherein the plurality of physical buffers is organized into a plurality of memory banks, wherein each memory bank contains a respective number of different physical buffers and is separately addressable by the host, and wherein each physical buffer is partitioned into a plurality of blocks, wherein each block is accessible using a corresponding Logical Block Address (LBA), wherein a size of each block is equal to a size of the memory page of user data received from the host, and wherein a respective plurality of LBAs is assigned to each block in the plurality of blocks using set-associativity, and wherein the memory-mapped buffer address of a given buffer in the plurality of buffers identifies a memory bank associated with the given buffer as well as the given buffer within the identified memory bank.

18. A system comprising:
an Input/Output (I/O) interface supporting communication of electronic content therethrough in a transmission format defined therefor;
a processor coupled to the I/O interface and supporting communication of electronic content over the I/O interface;
a storage device compatible with the I/O interface; and
a device driver associated with the storage device, wherein the device driver contains program instructions, which, when executed by the processor, cause the processor to perform the following:
  detect that the storage device is attached to the I/O interface; and
  write a first sequence of data patterns to the storage device using the I/O interface, wherein a data pattern in the first sequence includes an encoded version of respective command data bits of an I/O command, and wherein the data pattern in the first sequence is written a pre-determined number of times before a next data pattern in the first sequence is written to the storage device, wherein the pre-determined number is greater than one, and
wherein the storage device is operable through the device driver to perform the following:
  store a command data-containing portion of the data pattern in an addressable storage in the storage device;
  receive a control bit pattern from the processor over the I/O interface, wherein the control bit pattern includes an encoded I/O command; and
  use one or more command data-containing portions in the addressable storage to decode the encoded I/O command received through the control bit pattern.

19. The system of claim 18, wherein the storage device is one of the following:
a Solid State Drive (SSD) having a Dual In-line Memory Module (DIMM) form-factor;
a block-based storage device having the DIMM form-factor;
a storage device configured to operate via a Dynamic Random Access Memory (DRAM) interface; and
a storage device configured to operate via the I/O interface.

20. The system of claim 18, wherein the program instructions, when executed by the processor, cause the processor to further perform the following:

further write a second sequence of data patterns to the storage device using the I/O interface, wherein a data pattern in the second sequence includes an encoded version of a respective status data, and wherein the data pattern in the second sequence is written the pre-determined number of times before a next data pattern in the second sequence is written to the storage device, and wherein the storage device is operable through the device driver to further perform the following:
  store a status data-containing portion of the data pattern in the second sequence in a register in the storage Device;
  decode the received I/O command;
  access the register in the storage device;
  based on a result of an operation, retrieve a corresponding status data-containing portion from the register; and
  provide the retrieved status data-containing portion to the processor as a response to the received I/O command.

21. The system of claim 18, wherein the storage device includes:
a plurality of equal-sized physical buffers to store user data, wherein the plurality of physical buffers is organized into a plurality of memory banks such that each memory bank contains an identical number of different physical buffers and is separately addressable by the processor, wherein each physical buffer is partitioned into a plurality of equal-sized blocks, wherein each block is accessible using a corresponding plurality of Logical Block Addresses (LBAs) based on set associativity, and wherein a size of each block is equal to a size of a memory page of user data received from the processor, and wherein the storage device is operable through the device driver to further perform the following:
  receive the following from the processor via the I/O interface:
    a memory-mapped buffer address that identifies a memory bank associated with a given buffer in the plurality of physical buffers as well as the given buffer within the identified memory bank, and
    an encoded version of the memory page of user data;
  store the encoded version of the received user data into the given buffer having the memory-mapped buffer address;
  receive an instruction from the processor to read a content stored at the memory-mapped buffer address; and
  in response to the instruction, provide the stored encoded version of the received user data to the processor via the I/O interface.

* * * * *